US007613803B2

(12) United States Patent
Pioso

(10) Patent No.: US 7,613,803 B2
(45) Date of Patent: Nov. 3, 2009

(54) MIDDLE-WARE INTERFACE STATUS TOOL AND METHOD FOR USING SAME

(75) Inventor: Bennett G. Pioso, Clifton, VA (US)

(73) Assignee: Lockheed Martin Corporation, Bethesda, MD (US)

(*) Notice: Subject to any disclaimer, the term of this patent is extended or adjusted under 35 U.S.C. 154(b) by 623 days.

(21) Appl. No.: 10/456,560

(22) Filed: Jun. 9, 2003

(65) Prior Publication Data
US 2004/0250260 A1 Dec. 9, 2004

(51) Int. Cl.
*G06F 15/173* (2006.01)
(52) U.S. Cl. .................. 709/224; 709/217; 709/218; 709/219; 719/316
(58) Field of Classification Search ............. 719/316; 709/224, 217, 218, 219
See application file for complete search history.

(56) References Cited

U.S. PATENT DOCUMENTS 5,751,962 A * 5/1998 Fanshier et al. ............ 709/223
6,059,838 A * 5/2000 Fraley et al. ............... 717/108
6,295,558 B1 * 9/2001 Davis et al. ................ 709/224
2002/0132258 A1 * 9/2002 Okubo et al. ................ 435/6
2003/0033402 A1 * 2/2003 Battat et al. ............... 709/224

OTHER PUBLICATIONS

Orfali, Robert and Dan Harkey, "Client/Server Programming with JAVA and CORBA," Second Edition, John Wiley & Sons, Inc., 1998; pp. 3-30, 65-66, 78, 115-118, 135-140, 683-690 and 933-936.*

* cited by examiner

*Primary Examiner*—Andy Ho
(74) *Attorney, Agent, or Firm*—Witham, Curtis, Christofferson & Cook, P.C.

(57) ABSTRACT

The MIST provides a mechanism to dynamically determine and characterize the status of distributed objects that communicate in a complex, multiple sub-system, and systems integration environment. At run time, objects that should be participating in the environment are determined. A static database or dynamic learning mechanism is used to characterize the platform's interface graph. The status of event channels and servers, and their corresponding interfaces, are continuously determined and depicted. Status is graphically displayed by using various filtering, a circular interface display, and 2-D graph displays to allow a user to rapidly identify the occurrence, source, and impact of system interface faults.

41 Claims, 21 Drawing Sheets

MIDDLE-WARE INTERFACE STATUS TOOL AND METHOD FOR USING SAME

STATEMENT REGARDING FEDERALLY SPONSORED RESEARCH

The U.S. Government has a paid-up license in the inventions described herein and the right in limited circumstances to require the patent owner to license others on reasonable terms as provided for by the terms of contract No. N00024-01-C-6237.

BACKGROUND

Many complex, distributed systems use middle-ware such as the Common Object Request Broker Architecture (CORBA) as the mechanism to transfer data between hosts and sub-systems. Middle-ware is commonly used in systems to enable heterogeneous processors, Operating Systems (OSs), software languages, and architectures to inter-operate in a transparent fashion. Low-level details associated with network programming are abstracted from the software developer and interface software may be extended and re-used in an object-oriented manner. The physical peer host with which a host is communicating is also abstracted from the developer during development. This results in a challenging side-effect for end-users and integrators of systems that use this technology. At any given time, the host(s) that provide or receive specific data flows are not readily apparent, especially in cases where redundancy, fail-over, and significant quantities of data flows exist within the system architecture.

In systems, one can identify three primary tiers of hosts that participate in end-to-end data flow. At the front end are "Originators" that source the data, usually based on sensor or user input. Data from an Originator host may be provided to a second tier CORBA host ("Provider") that is responsible for further distribution after appropriate processing. The third tier of the data flow is called a "Recipient"; it is the ultimate user of the data in the system. Therefore, a single data flow in the system can traverse multiple hosts along its end-to-end path. The transfer from one host to the next in the system can be quite complex. Further complicating the situation for the user or developer that seeks to understand the system's current interface status is the quantity of data flows in a complex system. Ultimately, when a complex system is running, it is difficult for a user or even a developer to know when a fault occurs and what the likely cause of the fault is. When a fault occurs, the process to determine which host is successfully providing the data flow or not providing the data flow, which host(s) should be receiving the data and actually are receiving the data flow, and where along that path, from the Originator to the Producer and to the Recipient things have gone wrong is extremely difficult.

Many middle-ware architectures exist to facilitate data transfer in a complex system. A subset of CORBA is briefly described herein as exemplary middle-ware architecture. CORBA is an object-oriented method for distributing data. As briefly described above, CORBA provides transparency to the application programmer, such that the application programmer does not need to know specifically which host is providing the data of interest. The application only needs to know the name of the required data object and the hostname of the CORBA Name Server (CNS).

To receive data in a typical Client/Server model, an application resolves the location of an object by obtaining an IIOP Object Reference (IOR) from the CNS for the object of interest. The IOR contains the information necessary for the Client to connect to the Server (e.g., Server IP address, etc). After obtaining the IOR for the object, the Client may perform method calls to the Server in accordance with the Interface Definition Language (IDL) defined for that object.

Another common model for transfer of data is the event channel of the Event Service, based on a data "push" paradigm. For an event channel, the Recipient subscribes to data of interest, the Provider makes its data available to the event channel as data updates occur (e.g. periodic sensor data), and the event channel "pushes" data to all Recipients that have subscribed to receive the data. The event channel is often co-located with the application that is generating data for the event channel. This is a one-to-many distribution model wherein the Provider is decoupled from direct interaction with the Recipient. For the event channel, as for the Client/Server, the CNS performs resolution of object names.

In systems of the prior art, there is no toolset to describe the complete data flow throughout a complex system that uses middle-ware such as CORBA such that a user can identify if any fault(s) exist, the cause of any fault(s), and the resultant system effects of interface fault(s). Some individual sub-systems have incorporated monitoring capability within their sub-system that contains checks to attempt to determine which interfaces are operational; however, this is done from the perspective of the single sub-system. In many target environments, there may be twenty or more sub-systems and numerous hosts, such that the status checks need to be performed from a total system perspective.

An example is now described for a system that includes distribution of Navigation data via a CORBA middle-ware event channel. Since Navigation data is usually a fundamental piece of data for successful operation of a platform, it is required by and distributed to multiple sub-systems in the system. In systems of the prior art, if a sub-system does not receive the depth object information, an operator within that sub-system cannot easily pinpoint the cause of the fault. Potential reasons are numerous and include events such as loss of a physical link (e.g., broken fiber), loss of the host operating as the Provider, loss of the host operating as the Originator, loss of the Recipient host, an incorrect IOR in the CNS subsequent to an event channel fail-over operation, etc. Regardless of the reason, the requested data was not received. In the systems of the prior art, an operator typically sees an error message to indicate that the Navigation data was not received. It is difficult for the operator to determine if the fault is isolated to that sub-system or if a more widespread problem exists in the system. The operator within the sub-system may contact other sub-system operators to attempt to ascertain the scope and cause of the fault.

One sub-system may show a warning at the bottom of the operator screen with status to identify that it is or is not receiving data, for instance, navigation depth data. Another sub-system may utilize a similar warning message. Thus, the two operators may communicate with each other to determine that navigation depth data is not being received, but they cannot immediately see why they are not receiving the data, or whether another sub-system is. There is no global view of the system's data distribution via middle-ware.

SUMMARY

The present system and method describes a mechanism to identify and depict a system-wide middle-ware connectivity interface status graph (ISG) to system integrators and operators. The present system's ISG includes selected sub-systems, hosts, data groups, objects, and methods involved with middle-ware-based data flows in the system. The sub-systems, hosts, data groups, and objects comprise the vertices of the ISG. Connections between these vertices and methods comprise the edges of the ISG.

First, the present system determines the ISG that describes the system; three exemplary approaches to accomplish this are described including a static mode, a partially dynamic mode, and a fully dynamic mode. Each approach has advantages and disadvantages to consider for any implementation.

Next, the present system determines the status of elements within the ISG. Exemplary approaches that are minimally intrusive to sub-system hosts are described. A minimally intrusive approach is required to minimize impact to organizations that independently develop and deliver sub-systems for integration within a complex system.

Finally, the present system describes an approach to visually display the ISG to an operator to permit rapid identification of the occurrence, cause, and effect of system interface fault(s).

DESCRIPTION OF THE DRAWINGS

The detailed description will refer to the following drawings, wherein like numerals refer to like elements, and wherein.

DETAILED DESCRIPTION

The following detailed description is presented to enable any person skilled in the art to make and use the invention. For purposes of explanation, specific nomenclature is set forth to provide a thorough understanding of the present invention. However, it will be apparent to one skilled in the art that the specific nomenclature is not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
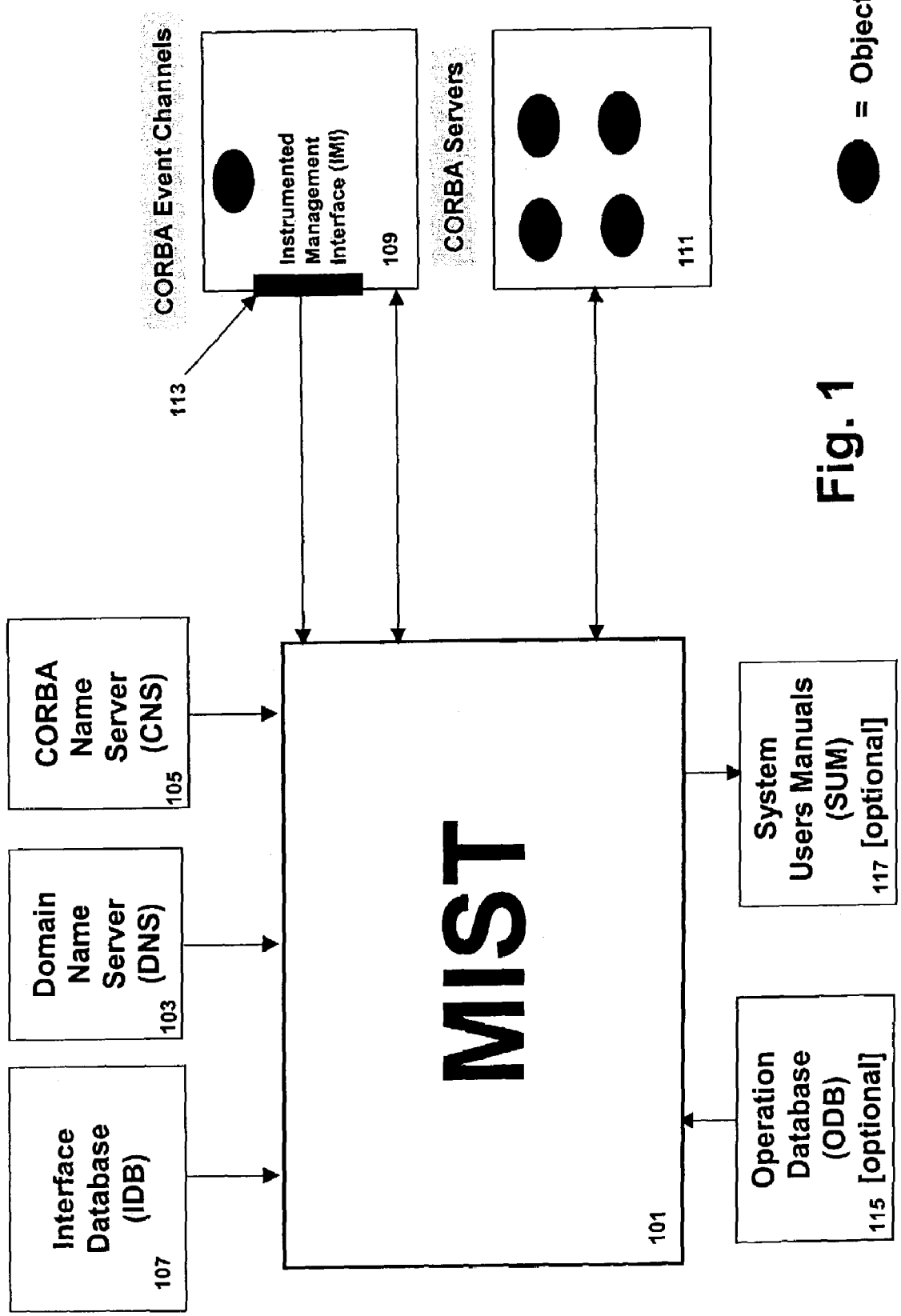
FIG. 1 is a block diagram that illustrates a high level architecture for an exemplary middle-ware interface status tool (MIST)

With reference now to FIG. 1 of the Drawings, there is illustrated a high level architecture for an exemplary middle-ware interface status tool (MIST). In an exemplary embodiment, the Common Object Request Broker Architecture (CORBA) is used for the middle-ware architecture, and is used to describe an embodiment of a MIST 101 herein. It will be apparent to one of ordinary skill in the art that the MIST could be used with other middle-ware architectures as an alternative to CORBA.

The MIST 101 communicates with different hosts, processes and databases as described in more detail in the following paragraphs.

As shown in FIG. 1, an interface database (IDB) 107 interfaces with the MIST; the IDB is used as a function of the user-selected MIST mode to determine the ISG. The IDB is required when the Static or Partially Dynamic modes are used to characterize the ISG. For the Fully Dynamic mode, the IDB is not required. The IDB contains a priori knowledge about data groups, CORBA objects, methods, Originators, Providers, and Recipients within the system, as illustrated in FIG. 1.

Within the IDB 107, the Originators, Providers, and Recipients are defined in terms of sub-systems. The objects are defined in terms of object name. The methods are defined in terms of method name. Data groups are partitions of the objects in the system that broadly organizes system functionality (e.g., Navigation, Alerts). A data group comprises multiple objects that provide specific types of data (e.g., attitude, motion, position, etc., for the Navigation data group).

For typical target environments, most of the data required in the IDB 107 is identified as a result of a lengthy interface definition process that involves representatives from independent sub-system development teams. System architects and designers must ensure that a Provider (i.e., Server and/or event channel) exists for any data required in the system (e.g., Navigation data), identify the specific sub-system that will provide the data, and identify the Recipients for the data to characterize loading. The specific hosts within a sub-system that originate, provide, or receive the data within the sub-system are not typically identified, since this information is not required as part of the middle-ware based interface definition; it is derived at run-time.

As further shown in FIG. 1, the MIST 101 interfaces with two categories of hosts: CORBA event channels 109 and CORBA servers 111. Each CORBA event channel 109 includes an instrumented management interface (IMI) 113 to communicate with the MIST via an event channel itself. An event channel 109 provides, via the IMI 113, definitive status of end-to-end receipt of data. The primary purpose of the IMI 113 within an Originator or Provider is to provide the MIST 101 with time-stamped connection status, connection updates and exception information for each of its event channels. Originators also provide data source status via the IMI 113. During operation in fully dynamic mode, the IMI 113 also identifies event channel methods and data Recipients. The IMI 113 is a minimally intrusive element added to each event channel; impact to development teams can be minimized by use of a common, reference event channel implementation that includes an IMI. The MIST 103 also periodically pings each CORBA event channel 109. This is done to verify network connectivity of the event channel and is used as an input for characterization of the ISG on the displays.

The CORBA servers 111 cannot provide the MIST 101 with definitive status of end-to-end receipt of data since the Client initiates each transaction. The MIST 101 determines the status of each server 111 by periodically querying the server to verify object processes are running and initiating CORBA calls to Server methods to determine Server object status. The MIST 101 also periodically pings each CORBA Server 111. This is done to verify network connectivity of the Server and is used as an input for characterization of the ISG on the displays.

With further reference to FIG. 1, a domain name server (DNS) 103 resolves a host name to an IP address. The DNS, or equivalent implementation of this function, is required by the MIST 101 to map the hostname contained in an object IOR to a physical host on the network.

A CORBA Name Server (CNS) 105, or equivalent function for non-CORBA middle-ware, includes a hierarchical directory of the data groups' objects within the system. Upon request from the MIST 101, the CNS 105 provides an IOR from the CNS for the object of interest. The IOR contains all the information necessary for the MIST 101 to connect to a CORBA event channel or Server (i.e., IP host name, etc.). For operation in fully dynamic mode, the CNS 105 (or equivalent) must provide capability for the MIST 101 to "walk" its structure. To "walk" the CNS 105, the MIST 101 performs available calls to the CNS to dynamically determine its structure.

During operation in Static and Partially Dynamic modes, more fully described below, the MIST 101 scans the IORs in the CNS 105 to map objects to hosts to populate hosts within the ISG. During operation in partially dynamic mode, the MIST 101 also maps the host to a sub-system based on its fully qualified hostname or IP subnet.

During operation in fully dynamic mode, the MIST "walks" the CNS directory in order to populate the data groups and objects in the ISG. The MIST 101 also scans the IORs in the CNS 105 to map objects to hosts and sub-systems.

An optional interface from the MIST 101 to an Operation Database (ODB) 115 contains a mapping of detected interface faults to operational impacts. This permits the MIST user to determine the operational effects of identified and displayed faults. For example, the ODB 115 indicates if unavailability of data from a specific data group precludes completion of missions usually performed by the platform.

An optional interface from the MIST 101 to the System User Manual (SUM) 117 contains a mapping of detected errors to page(s) (e.g., URL) within the SUM. This permits the MIST user to obtain detailed information for an identified fault.

Figure 2:
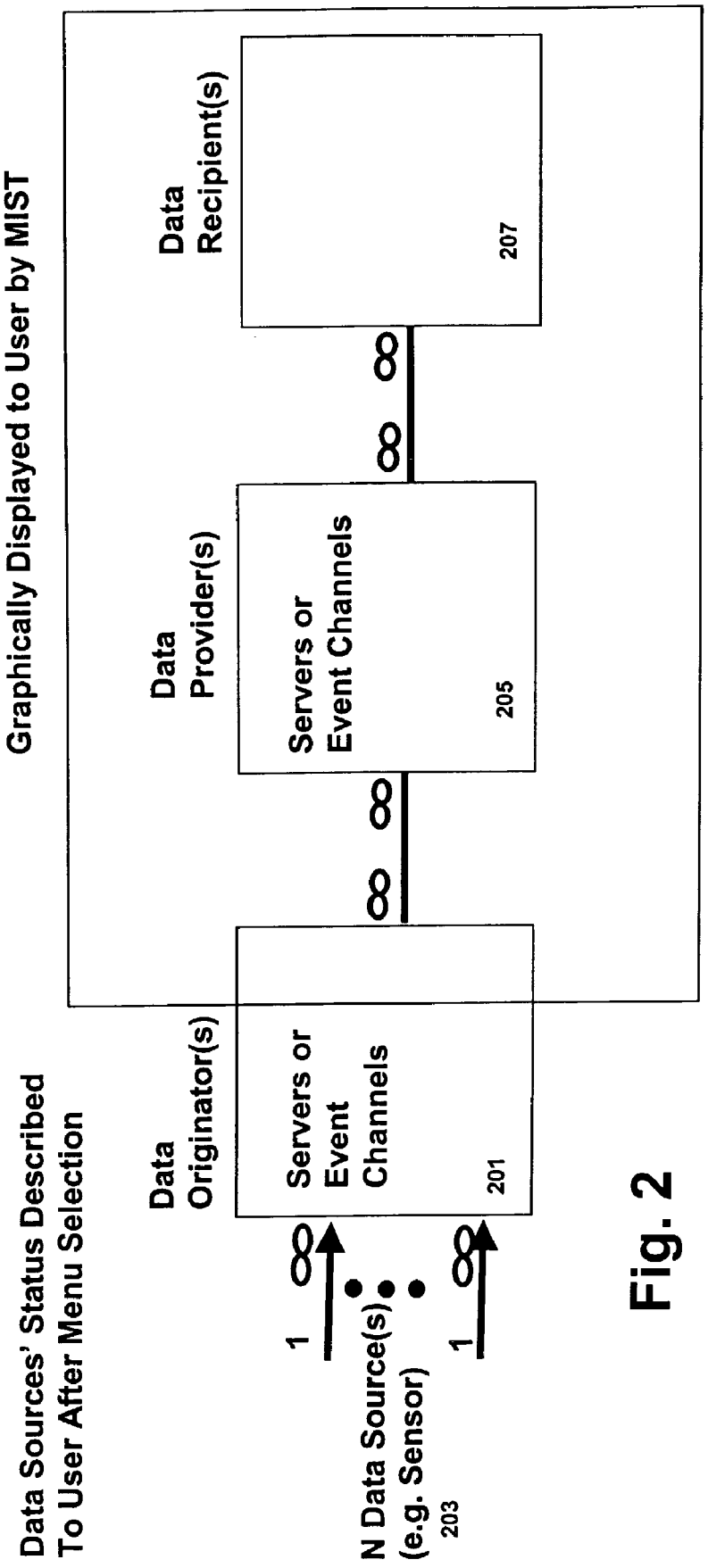
FIG. 2 is a block diagram that characterizes the three tiers of hosts (Originator, Provider, Recipient) through which a data flow traverses the system and their relationship (e.g., many-to-many). Also, the relationship of data sources (e.g., Sensor) to the Data Originator is depicted.

With reference now to FIG. 2 of the Drawings, there is illustrated a block diagram that characterizes the three tiers of hosts (Originator, Provider, Recipient) through which a data flow traverses the system and their relationship (e.g., many-to-many). As shown in FIG. 2, there are a variable number (N) of data source(s) 203 in the system that derive data, usually based on sensor input. Each data source can provide its data to one or more data Originator(s) 201 as part of a one-to-many relationship as indicated by the "∞" symbol. The set of data Originators 201 have a many-to-many relationship with the data Provider(s) 205. Each data Originator can send its data to one or more data Provider(s) 205; and, each data Provider 205 can receive data from multiple data Originator(s) 201. Finally, the data Providers 205 have a many-to-many relationship with the data Recipients 207. The nature of these relationships determines the structure of the ISG, as later described in connection with FIG. 6 and the user displays as described in connection with FIG. 7.

Figure 3:
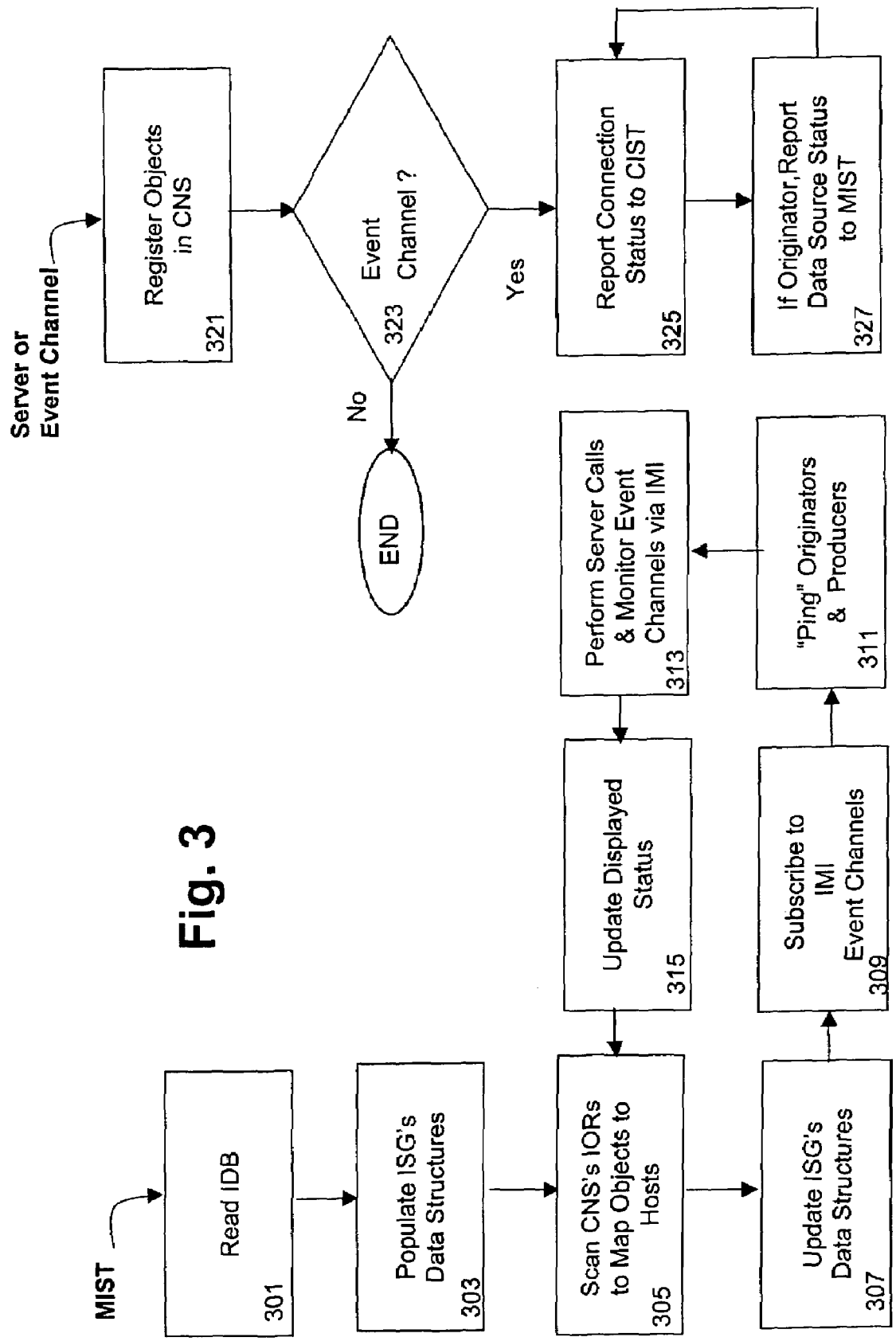
FIG. 3 is a flow diagram that illustrates an exemplary approach to determine the ISG and monitor its status. A static approach to build the ISG is described that relies on both the contents of an interface database (IDB) and information derived from IORs in the CNS. The activities of the MIST, Servers, and event channels are described.

FIG. 3 is a flow diagram that illustrates an exemplary static approach to determine the ISG and monitor its status. A static approach to build the ISG is described that relies on the contents of an IDB, such as the IDB 107 in FIG. 1. The IDB is fully populated with a priori information, as described above. In step 301 in FIG. 3, the MIST 101 reads the IDB 107. Data structures of the ISG, including data groups, CORBA objects, CORBA methods, Provider sub-systems, Recipient sub-systems, and Originator sub-systems, and the quantity of Originator(s) and Provider(s) per object are populated in step 303. Based on the listing of the CORBA objects contained in the IDB 107, each CNS object IOR is scanned to map each object to a host in step 305. The ISG's data structures are further updated in step 307 based on the information derived from the IORs. The update process in 307 is repeated in a loop because the host in which an object resides can change over time due to events such as a fail-over. The MIST 101 subscribes to IMI event channels in step 309 to enable the MIST to receive event channel status. The Originators and Producers are "pinged" in step 311 to verify their network connectivity. IMI event channel inputs are monitored and server calls are performed in step 313. Server calls include queries to the server to verify object processes are running and CORBA calls to Server methods to determine Server object status. The system's interface status is updated for display in step 315. A variety of display options may be selected, as described below. Processing loops repeatedly through steps 305 to 315. As the ISG and the interface status of the system changes, the displays are updated.

The actions required by the server and event channel in static mode, as also shown in FIG. 3, are now described. In step 321, the server and event channels register their objects in the CNS 105 as normally required for CORBA-based communications. Servers take no further action based on decision 323, as shown by terminator "END" in FIG. 3, and event channels 109 continue based on decision 323. The event channel 109 reports its connection status to the MIST 101 via the IMI event channel 109 in Step 325. If the event channel 109 is an Originator, the event channel reports its data source status to the MIST 101 via the IMI event channel in step 327. Steps 325 and 327 are repeated in a loop, as indicated.

For the static mode described in FIG. 3, almost all information used to create the ISG is defined a priori and populated in the IDB 107. An exception is the hostname in which each object resides. While somewhat restrictive, this embodiment provides the most definitive interface status information to the user. The static mode provides the user with a definitive indication of whether: 1) the CNS naming directory is appropriately structured, 2) correct objects and methods are operating in the system, 3) appropriate sub-systems have attached to event channels and are receiving data, 4) there are any affected hosts for event channel faults, 5) data is available from a server for sub-systems that require data from that server, and 6) the correct quantity of Originators and Providers for each object are operating. The static mode is consistent with an interface definition and change control process used for some systems as described above. Each new release and delivery of system or sub-system software that impacts the content of the IDB 107 must result in an update to the IDB 107. To address this limitation, alternate embodiments that provide more dynamic determination of the ISG are defined below. In alternative embodiments, the information contained in the IDB 107 is not fully identified a priori and is instead learned by the MIST 101 at run time. These embodiments are more fully described in connection with FIG. 4 and FIG. 5.

Figure 4:
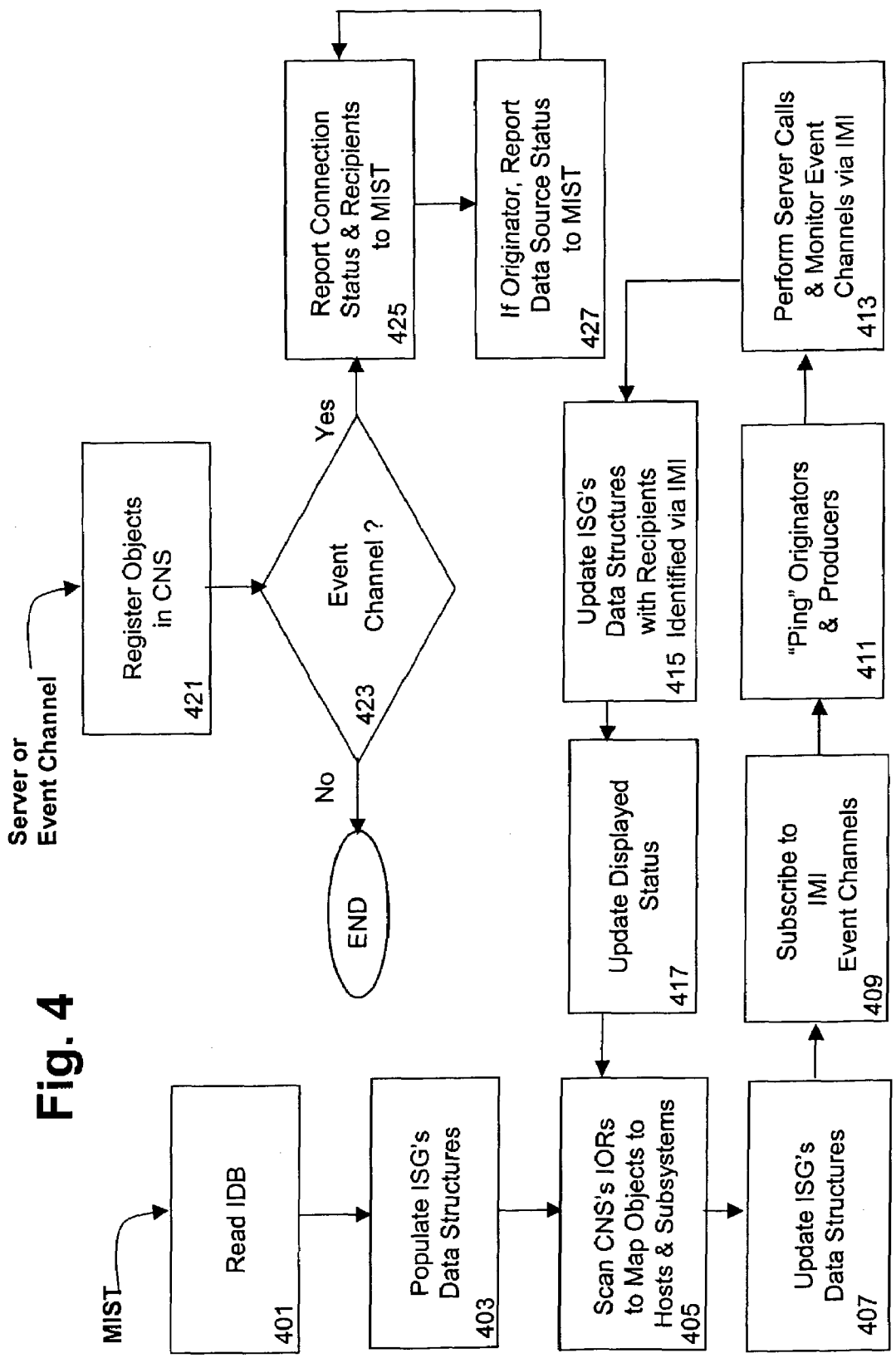
FIG. 4 is a flow diagram that illustrates an exemplary approach to determine the ISG and monitor its status. A partially dynamic approach to build the ISG is described that relies on both the contents of an IDB and information derived from IORs in the CNS. The activities required of the MIST, Servers, and event channels are described.

With reference now to FIG. 4 of the Drawings, there is shown a flow diagram illustrating an exemplary partially dynamic approach to determine the ISG and monitor its status. A partially dynamic approach to build the ISG is described that relies on the contents of an IDB, but relies on the IDB 107 less than in a static mode. The IDB 107 is populated with some a priori information. In step 401, the MIST 101 reads the IDB 107. Data structures of the ISG including data groups, CORBA objects, CORBA methods, and the quantity of Originator(s) and Provider(s) per object are populated in step 403. Differences with the static mode include: 1) the Originator, Producer, and Recipient sub-systems are not contained in the IDB 107, 2) the Recipient sub-systems and hosts are received via the IMI 113. Based on the listing of the CORBA objects contained in the IDB 107, each CNS object IOR is scanned to map it to a sub-system and host in step 405. An Originator or Producer sub-system is determined by mapping the hostname in an IOR to a sub-system's defined domain name or Internet Protocol (IP) subnet. The ISG data structures are further updated in step 407 based on the information derived from the IORs. The update process in 407 is repeated in a loop because the host in which an object resides can change over time due to events such as a fail-over. The MIST 101 subscribes to IMI event channels in step 409 to enable the MIST to receive event channel status. The Originators and Producers are "pinged" in step 411 to verify their network connectivity. IMI event channel inputs are monitored and server calls are performed as part of step 413. Server calls include queries to the server to verify object processes are running and CORBA calls to Server methods to determine server object status. The Recipient sub-systems and hosts are reported to the MIST 101 in step 413. The system's ISG is updated in step 415. The system's interface status is updated for display in step 417. A variety of display options may be selected, as described below. Processing loops repeatedly through steps 405 to 417, and, as the ISG and interface status of the system changes, the displays are updated.

The actions required by the server or event channel in partially dynamic mode, as shown in FIG. 4, are now described. In step 421, server and event channels register their objects in the CNS 105 as normally required for CORBA based communications. Servers take no further action based on decision step 423, as shown by terminator "END" in FIG. 4, and event channels continue based on decision step 423. The event channel reports its connection status to the MIST 101 via the IMI event channel in step 425. The MIST uses the Recipient definition in these IMI reports as an input to dynamically build the ISG. If the event channel is an Originator, the event channel reports its data source status to the MIST 101 via the IMI event channel in step 427. Steps 425 and 427 are repeated in a loop.

For the partially dynamic mode described in FIG. 4, information used to create the ISG is defined a priori and populated in the IDB 107 to a lesser extent than the static mode, received from the event channels via the IMI 113, and derived from the IORs in the CNS 105. This is less restrictive than the static mode, but provides less definitive status information to the user. The partially dynamic mode provides the user with a definitive indication of whether: 1) the CNS naming directory is appropriately structured, 2) correct objects and methods are operating in the tactical system, and 3) the correct quantity of Originators and Providers for each object are operating. However, the MIST user does not know: 1) if appropriate sub-systems have attached to event channels, other than user's determination based on experience, 2) the affected hosts for event channel faults for any hosts that have not connected to the event channel and been reported by the event channel to the MIST 101 via the IMI 113, 3) the affected sub-systems and hosts that require data from non-operational servers, and 4) the Originator or Producer subsystem and host for an object that has not been previously placed in the CNS. However, the partially dynamic mode allows functionality to move within the system (e.g., from one sub-system to another) without a need to reflect that information in the IDB 107.

Figure 5:
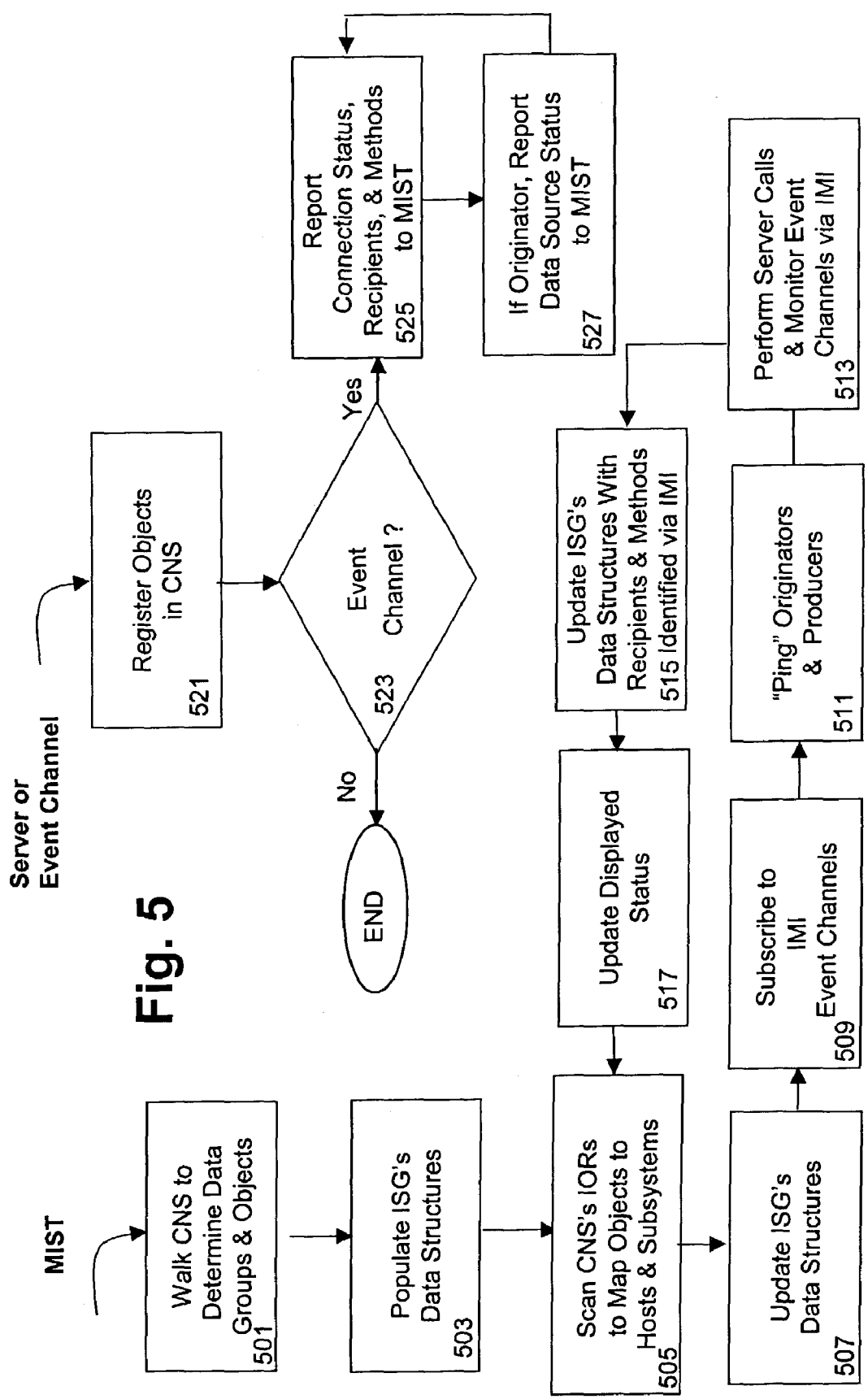
FIG. 5 is a flow diagram that illustrates an exemplary approach to determine the ISG and monitor its status. A fully dynamic approach to build the ISG is described that relies on "walking" the CNS, information derived from IORs, and information received via the Instrumented Management Interface (IMI). The activities required of the MIST, Servers, and event channels are described.

With reference now to FIG. 5 of the Drawings, there is shown is a flow diagram illustrating an exemplary fully dynamic approach to determine the ISG and monitor its status. A fully dynamic approach to build the ISG is described that does not rely on the contents of an IDB 107. In Step 501, the MIST 101 "walks" the CNS 105 to determine the data groups as encoded in the structure of the naming directory. To "walk" the CNS, the MIST 101 performs calls to the CNS 105 to dynamically determine its structure. This data is used to update the ISG in Step 503. Each CNS object IOR is scanned to map each object to a sub-system and host in step 505. An Originator or Producer sub-system is determined by mapping the hostname in an IOR to a subsystem's defined domain name or Internet Protocol (IP) subnet. The ISG data structures are further updated in step 507 based on the information derived from the IORs. The update process in 507 is repeated in a loop because the host in which an object resides can change over time due to events such as a fail-over. The MIST 101 subscribes to IMI event channels in step 509 to enable the MIST to receive event channel status. The Originators and Producers are "pinged" in step 511 to verify their network connectivity. IMI event channel inputs are monitored and server calls are performed in step 513. Server calls include queries to the server to verify object processes are running and CORBA calls to server methods to determine server object status. During the initial loop, a call to a pre-defined server method is required to identify methods available from each server object. The Recipient sub-systems, Recipient hosts, and object methods are reported to the MIST in step 513. The ISG is updated in step 515. The system's interface status is updated for display in step 517. A variety of display options may be selected, as described below. Processing loops repeatedly through steps 505 to 517; as the ISG and the interface status of the system changes, the displays are updated.

The actions required by the server or event channel in fully dynamic mode, as shown in FIG. 5, are now described. In step 521, server and event channels register their objects in the CNS 105 as normally required for CORBA based communications. Servers take no further action based on decision 523, as shown by terminator "END" in FIG. 5, and event channels continue based on decision 523. The event channel reports its connection status to the MIST 101 via the IMI event channel in Step 525. The MIST uses the Recipient and method definition in these IMI reports as an input to dynamically build its ISG. If it is an Originator, the event channel reports its data source status to the MIST 101 via the IMI event channel in step 527. Steps 525 and 527 are repeated in a loop.

For the fully dynamic mode described in FIG. 5, information used to create the ISG is determined by "walking" the CNS naming directory, received from the event channels via the IMI 113, obtained from server calls, and derived from the IORs in the CNS 105. This is far less restrictive than the static and partially dynamic modes, but provides less definitive status information to the user. The fully dynamic mode provides the user with a definitive indication of whether: 1) the groups and objects derived from the CNS 105 are operational and 2) Recipients identified by event channels' IMI reports are successfully receiving data from methods identified by the IMI reports. However, in this mode, the MIST user does not know: 1) if the CNS naming directory is appropriately structured, 2) if appropriate sub-systems have attached to event channels, other than user's determination based on experience, 3) the affected hosts for event channel faults for any hosts that have not connected to the event channel and been reported by the event channel to the MIST 101 via the IMI 113, 4) the affected sub-systems that require data from non-operational servers, 5) the correct quantity of Originators and Providers for each object are operating and 6) the Originator or Producer subsystem and host for an object that has not been previously placed in the CNS. The fully dynamic mode allows functionality to move within the system (e.g. from one sub-system to another) and the functionality itself to change (e.g. different data groups) without a need to reflect that information in the IDB 107.

Figure 6:
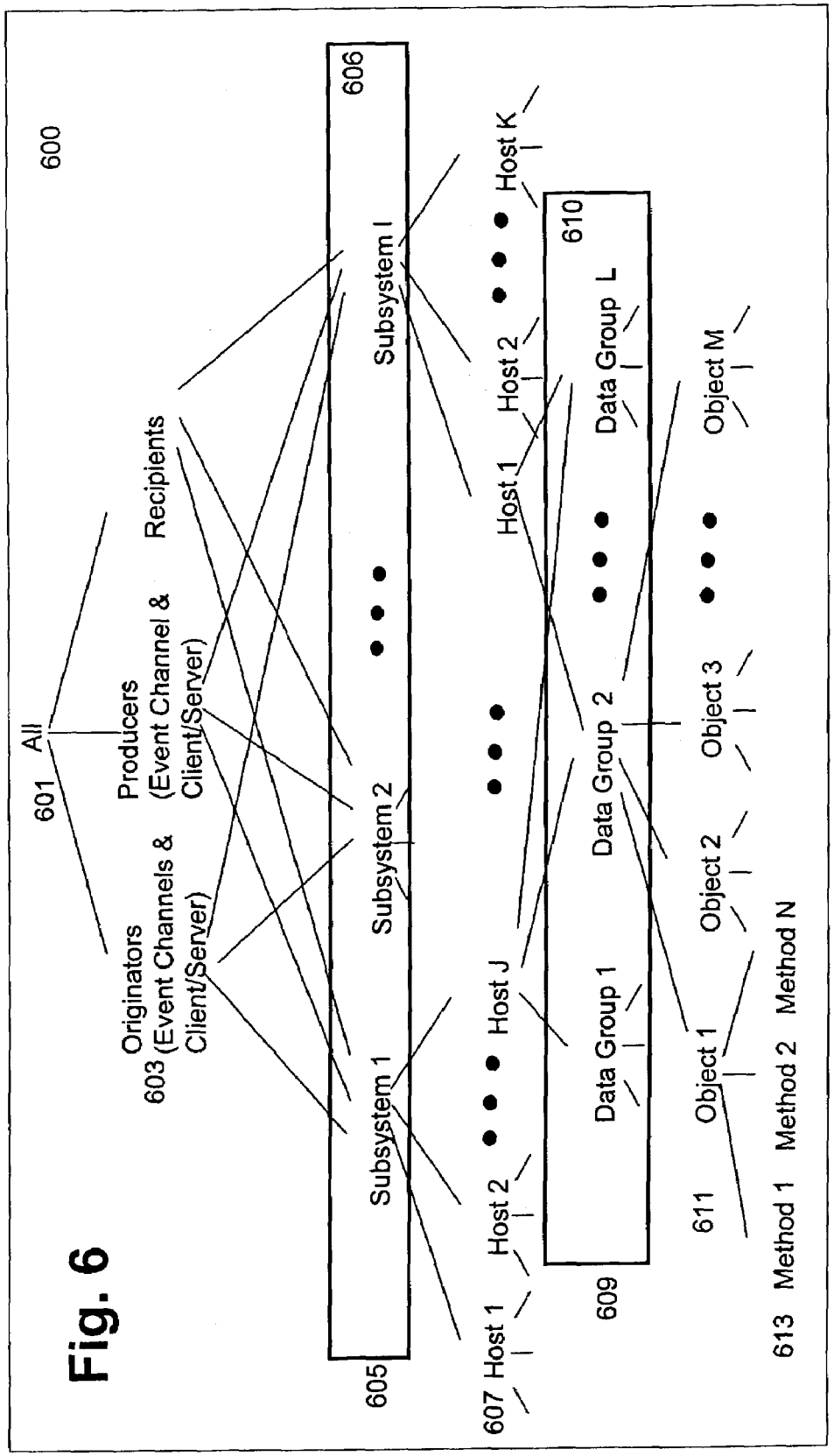
FIG. 6 illustrates an exemplary ISG that results from the modes described in FIG. 3, FIG. 4, and FIG. 5.

With reference now to FIG. 6 of the Drawings, there is shown an illustration of an exemplary ISG, generally designated by the reference numeral 600, that is monitored by the MIST 101. At a level one from the root node, designated by the reference numeral 601, there are three nodes, a level collectively designated by the reference numeral 603: 1) Originators, 2) Producers and 3) Recipients. The Originator, Producer and Recipient nodes at level 603 have edges to one or more sub-systems at another level 605. Each sub-system within level 605, in turn, has edges to one or more host nodes at level 607. Each host within level 607 has edges to one or more data group nodes 609. Each data group node within level 609, in turn, has edges to one or more object nodes 611, and each object node has edges to one or more methods, generally designated by the reference numeral 613. It should be understood that the event channel methods have edges between {Originator, Producer} or {Producer, Recipient} object pairs. To minimize the intrusiveness of MIST 101, no attempt is made to include or characterize edges between client/server Producers' methods and Recipient hosts. Alternative embodiments could provide this but it would require additional instrumentation within the Recipient hosts. During operation in static, partially dynamic, or fully dynamic mode, the MIST 101 is required to determine fault status for the ISG shown in FIG. 6. Care must be exercised to distinguish unknown fault conditions from known error faults. An exemplary approach to identify fault conditions is now described for each of the items in FIG. 6. This exemplary methodology is provided for object methods, objects, data groups, hosts, subsystems and Originator/Producer/Recipients.

METHODS

Producer or Originator: For event channels, a fault (unknown) is identified for the method if the Producer or Originator is not reporting on the method via the IMI. For client/servers, a fault is identified if the server is not responding to an object method call.

Recipient: For event channels, a fault is identified if (i) the Recipient is not successfully receiving data pushed via an event channel method as reported by the Producer or Originator via the IMI or ii) a corresponding unknown method fault exists for the Producer or Originator.

For client/server, a fault is not identified for Recipients of client/server interactions in this embodiment.

OBJECTS

Producer or Originator: For event channels, a fault is identified if (i) faults are aggregated from methods connected to the object per the ISG; (ii) the object is not in the CNS, or (iii) the Producer/Originator event channel object is not providing event channel status to the MIST (unknown), or (iv) there is a mismatch between the host in the IOR obtained from the CNS versus the host that is reporting status for the event channel to the MIST via the IMI.

For client/server, a fault is identified if (i) faults are aggregated from methods connected to the object per the ISG; (ii) the object is not in the CNS, or; (iii) the server is not responding to an object method call.

Recipient: For event channels, a fault is identified if (i) faults are aggregated from methods connected to the object per the ISG; or (ii) a corresponding unknown method fault exists for the Producer or Originator object.

For client/server, potentially impacted hosts are displayed based on a tool selection; this is a potential impact since the client/server mechanism is often a-periodic and the Recipient may not require data.

DATA GROUP

A fault is determined by aggregation of faults for objects connected to the data group per the ISG.

HOSTS

A fault is determined by i) aggregation of faults for data groups connected to the host per the ISG or ii) the host is non-responsive to a "ping".

SUB-SYSTEM

A fault is determined by aggregation of faults for hosts connected to the sub-system per the ISG.

ORIGINATOR/PRODUCER/RECIPIENT

A fault is determined by aggregation of faults for sub-systems connected to the Originator/Producer/Recipient per the ISG.

Numerous possible approaches exist to perform aggregation of fault status between levels of the ISG. Two exemplary approaches are: (1) worst of level below, and (2) best of level below (e.g., redundancy). For any chosen approach, the MIST preferably distinguishes unknown fault conditions from known error conditions.

A user interface to depict the ISG described in connection with FIG. 6 is described herein. One embodiment of a MIST user interface provides capability for the user to "slice" the ISG both vertically and horizontally. The primary MIST user interface is implemented by a circular interface display format that is described in later figures.

With further reference to the ISG 600 in FIG. 6, a horizontal view slices the ISG based on the user's desired viewpoint, e.g., (1) status of sub-systems 606; or (2) status of data groups 610. A horizontal view corresponds to all nodes at the same level within the ISG 600. An exemplary horizontal slicing mechanism is implemented with "tabs" or similar mechanisms on a display. A tab "widget" is commonly available within most languages' graphic user interface (GUI) toolsets (e.g., JTabbedPane in Java™). (Java™ is a trademark of Sun Microsystems Inc.). The horizontal slice helps to determine graphical display content within the MIST 101. For example, after selection of a horizontal slice, the data at and below the selected slice's graph depth is displayed in a display area to allow further display selection.

A vertical slice limits the view of the current, user-selected horizontal level slice. An exemplary vertical slicing mechanism is implemented by a cursor "highlight" or similar mechanism on a tree "widget." A tree "widget" is commonly available within most languages' GUI language toolsets (e.g., JTree in Java™). A vertical slice helps to determine the graphical display content within the MIST 101. For example, if a data group horizontal slice 610 is selected, a user may select a specific data group (e.g., navigation) within the tree display format to further control display content. In contrast to the tree mechanism, selection of the Originator/Provider/Recipient (OPR) vertical slice is implemented in one embodiment by a pull-down pick-list within the MIST.

Figure 7:
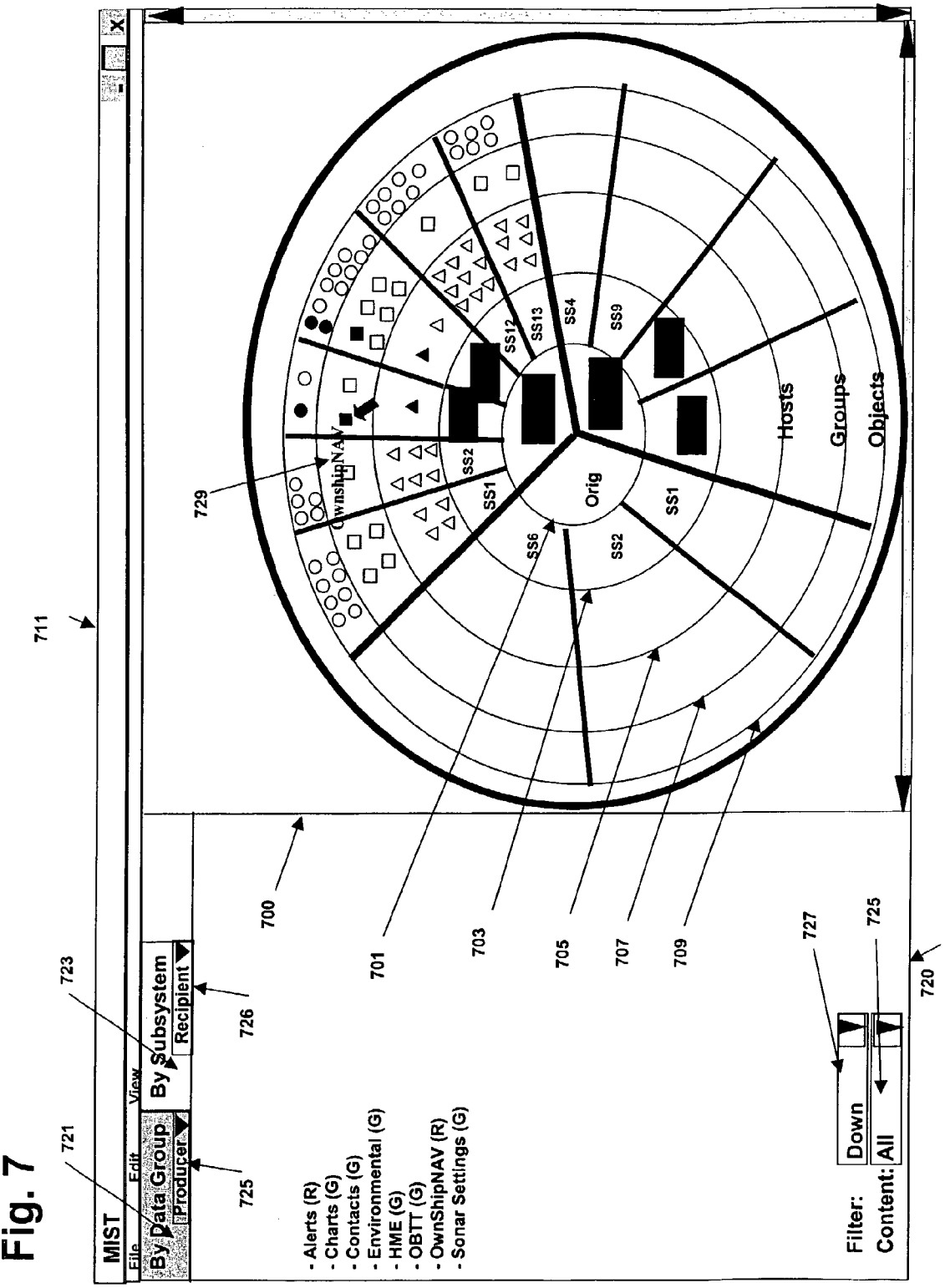
FIG. 7 illustrates an exemplary circular interface display with the "By Data Group" tab selected and "Producer" selected in the pick-list; key characteristics and components of the circular interface display are described.

An exemplary display of the system's ISG is the circular interface display shown in FIG. 7. The circular interface display, generally designated by the reference numeral 711, is comprised of a circular display pane 700 and a tree filter pane 720. This display 711 provides a user with a system-level visualization of interface faults; important purposes of the MIST 101 include identifying and resolving interface faults and assessing their impact. In this display, the center of the circular display pane 700 is the root 601 of the aforementioned ISG 600. Graph levels are depicted in succeeding rings of the circular display pane 700, as described in detail below. At levels beyond the sub-system level, colored shapes without text characterize information until user action is initiated. Edges of the ISG are not normally displayed on the circular display pane 700 because of the large number of edges present in the ISG; user action can result in display of ISG edges on the circular display pane 700.

As discussed, FIG. 7 illustrates an exemplary circular display pane 700. The first ring 701 from the center represents the Originators, Producers, and Recipients 603 of the ISG 600. The next ring 703 includes the sub-systems from the ISG 600. The next ring 705 is the host layer to show a relationship between hosts in the system and their corresponding sub-system. The next successive rings are the data group ring 707 and the object ring 709, respectively, as shown in FIG. 7.

The circular display pane 700 is displayed on the right side of this exemplary display, while the tree filter pane 720, control tabs, and menus appear on the left. It will be apparent to one of ordinary skill in the art that a user appropriate display format could be configured differently with no loss of information. In the exemplary display shown in FIG. 7, there are two tabs, entitled, "By Data Group" 721 and "By Sub-system" 723. These provide the user with capability to select a viewpoint and provide a horizontal slicing mechanism. The user may enable one of these two tabs at any given time. Embedded within each of these two tabs is a pick-list 725 and a pick-list 726 to select the Originator, Provider, or Recipient (OPR) subset (vertical slice) for detailed display. Within the circular display pane 700, hosts, data groups and objects are displayed for only the OPR subset chosen by the user in 725 or 726. For the non-selected OPR subset, the circular display pane 700 includes only the sub-system status. Similarly, the tree filter pane 720 contains information for only the OPR subset chosen by the user in 725 or 726. Selection of tab 721 or 723 further determines the content of the tree filter pane 720. If tab 721 is selected, the tree filter pane 720 contains a tree that starts at the data group level 610 of the ISG 600. If tab 723 is selected, the tree filter pane 720 contains a tree that starts at the Sub-system level 606 of the ISG 600. From the tree filter pane 720, a user can expand the tree to display lower levels of the ISG 600 or collapse the tree subsequent to an expansion. The user may perform vertical filtering from within the tree filter pane 720. If an item is selected from within the tree contained in the tree filter pane 720, the content of the circular display pane 700 is filtered to reflect that selection.

The default, as shown in FIG. 7, is to display all items based on the horizontal slicing selection 721 or 723. No further filtering is performed. When filtering is selected from the tree filter pane, the default is to display "All" content 725, as illustrated. The available filtering mechanism is now described.

Upon user selection of an item within the tree filter pane 720, the display defaults are now described. The defaults correspond to the OPR subset selected in 725 or 726; the circular display pane 700 displays items in rings at ISG levels below the selected item that are connected via a graph edge from the selected item. Non-connected items are not displayed. Items in rings for graph levels above the selected item on 720 are displayed on the circular display pane 700; however, they reflect only the filtered items that remain on the circular display pane 700. For the non-selected OPR subset, only the sub-system status is shown; the sub-system status reflects the filtering that would have occurred if it were the current OPR subset. This ensures that the non-selected OPR segments of the circular display pane 700 are consistent with the selected OPR subset. Other display filtering options, within the circular display pane 700, are available and described in later figures. For example, the content of the display circular display can be further filtered to include all items per above, fault items only, or a custom configuration of items User tools are available from the tree filter pane 720 and circular display pane 700. These tools are described in detail in subsequent figures. From the circular display pane 700 and tree filter pane 720, the following tools are available to the user:

Link Elements:
   This tool provides capability to link elements (e.g., data group) in one ring to elements in other rings (e.g., Host to data group, data group to object(s), data group to host(s)), Cause-Effect Analysis:
   For Originators and Producers, this tool provides capability to depict the effects of faults identified in the ISG. For Recipients and Producers (if receiving data from an Originator), this tool provides capability to depict the likely cause of faults identified in the ISG.

Data Source Status:
   For Originators, this tool provides an indication of data source status.

Operation Impact (Optional):
   This tool indicates the impact of a fault condition to platform operations.

Link to User's Manual (Optional):
   This tool provides a hyperlink from a fault condition identified on the MIST display to a section of the User's Manual.

In an exemplary embodiment, a color scheme is used within the circular display pane 700 and the tree filter pane 720 to depict the status of existing faults within the ISG. A green, yellow, red, and purple color scheme may be used to indicate that normal, warning, and critical conditions exist or that the state is unknown, respectively. The color assigned to a display element is based on the fault identification and fault aggregation process described above. It will be apparent to one of ordinary skill in the art that other colors or schemes may be used to distinguish among normal, warning, critical, and unknown states. For illustrative purposes, on these black and white figures, color is indicated in parenthesis after colored text. For instance, normal green data groups are represented as "Charts (G)," "Contacts (G)," "Environmental (G)," "HME (G)," "OBTT (G)", and "Sonar Settings (G)"; and, critical red data groups are represented as "Alerts (R)" and "OwnshipNAV (R)"; etc. For illustrative purposes, color is indicated for the geometric items (e.g. objects, hosts) of the circular display pane 700 as unfilled for normal (green) and filled for critical (red).

The specific selections of the exemplary display in FIG. 7 are now described. In this example, the By Data Group tab 721 is highlighted and Producer is selected in 725. Within the circular display pane 700, hosts, data groups and objects are displayed for only Producer sub-systems based on the Producer selection in 725. Based on the By Data Group selection in 721, eight existing data groups from the ISG 610 are displayed in the tree filter pane 720 for the exemplary embodiment: Alerts, Charts, Contacts, Environmental, HME, OBTT, OwnShipNAV, and Sonar Settings. The Content pick-list 725 displays "All" based on user selection from a menu or the pick-list; as a result, both fault and non-fault conditions are displayed within the circular display pane 700. No vertical slice filtering has been activated from the tree filter pane 720. As shown by the reference numeral 729 in FIG. 7, the name of an element on the circular interface display can be displayed in pop-up text upon user selection of a menu item.

Figure 8:
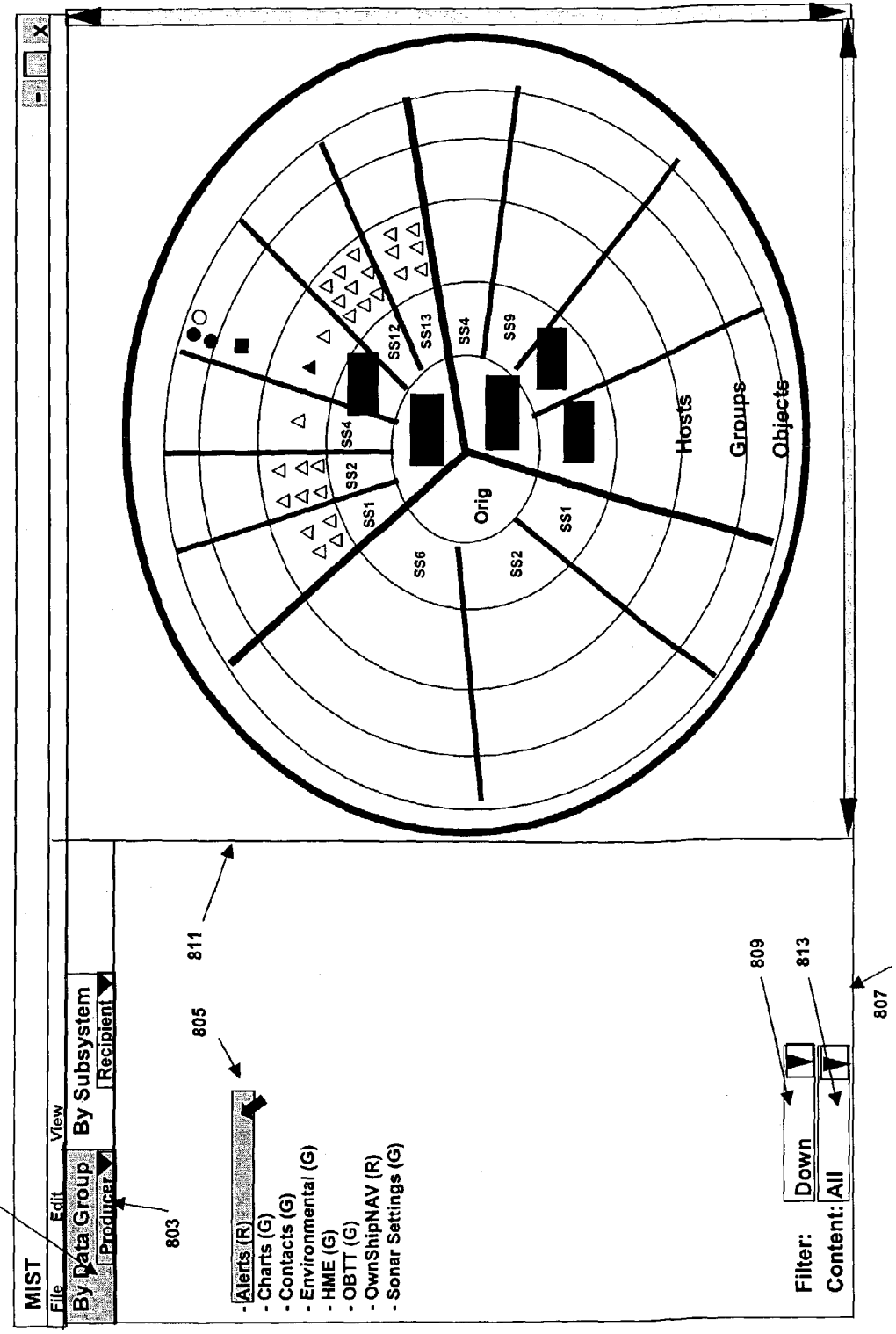
FIG. 8 illustrates an exemplary circular interface display with the "By Data Group" tab selected and "Producer" selected in the pick-list. The results of user initiation of vertical filtering (data group) with Content set to "All" and Filter set to "Down" are shown.

With reference now to FIG. 8 of the Drawings, there is illustrated an exemplary circular interface display with a "By Data Group" tab 801 selected and "Producer" selected in a pick-list 803. The results of user initiation of vertical filtering (data group) with Content set to "All" and Filter set to "Down" are shown by the reference numerals 809 and 813. Based on the user's selection of Alerts 805 from the tree filter pane 807, illustrated in FIG. 8 by shading over Alerts, only Alerts elements are displayed within the Producer segment of the circular display pane 811. The filter set to "Down" 809 causes only the Alerts group objects to be displayed for all Producer sub-systems; however, all hosts are displayed whether they participate in the Alerts data group or not. Producers' host status reflects the remaining items on the display. For the Originator and Recipient sections of the circular display pane 811, sub-system status reflects the filter selections; i.e., the Alerts data group, hosts involved with Alerts data transfer, and Alerts objects contribute to their status. The content selection set to "All" 813 causes both fault and non-fault conditions to be displayed on the circular display pane, subject to other selections described above.

Figure 9:
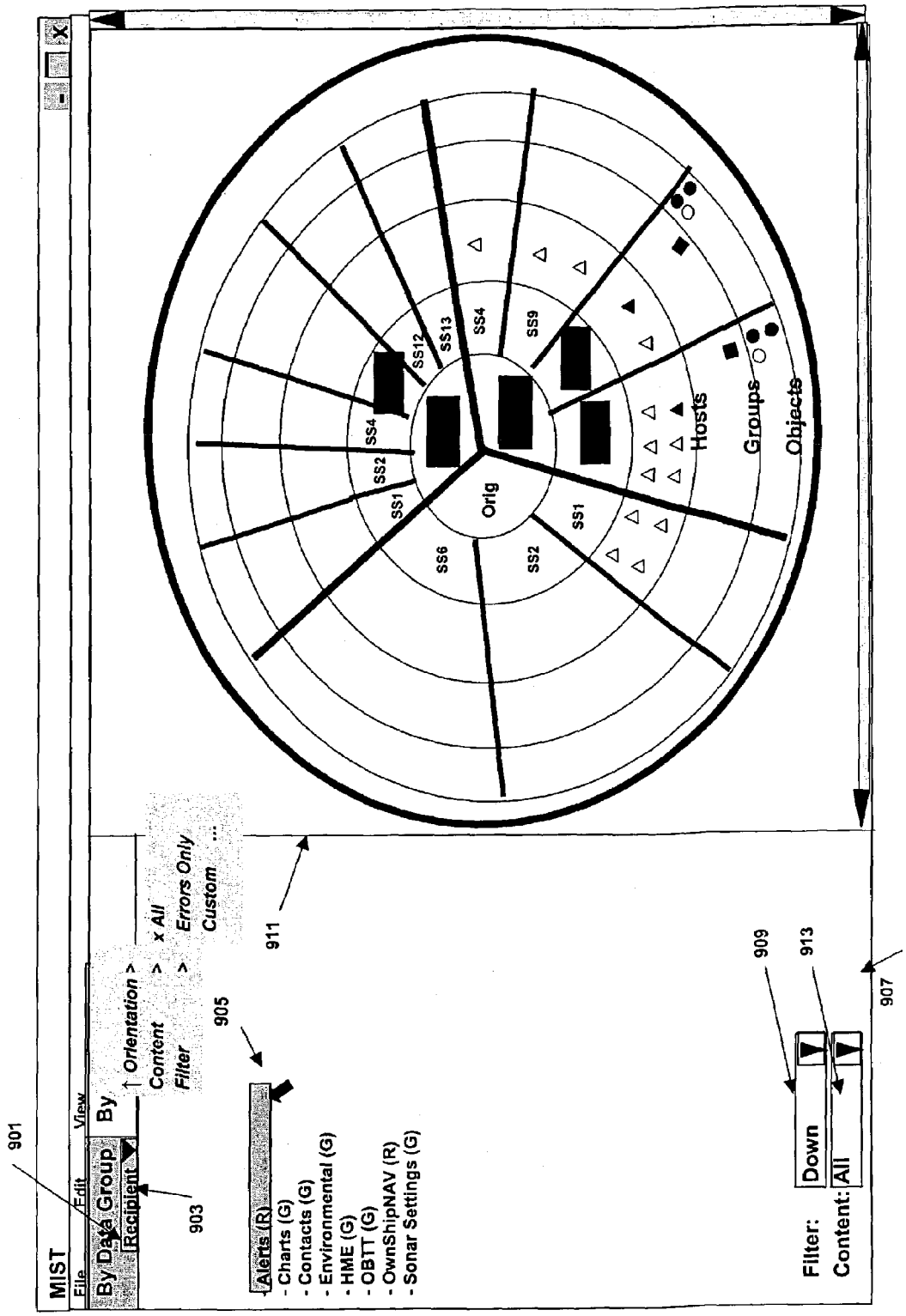
FIG. 9 illustrates an exemplary circular interface display with the "By Data Group" tab selected and "Recipient" selected in the pick-list. The results of user initiation of vertical filtering (data group) with Content set to "All" and Filter set to "Down" are shown.

With reference now to FIG. 9 of the Drawings, there is illustrated an exemplary circular interface display with a "By Data Group" tab 901 selected and "Recipient" selected in a pick-list 903. The results of user initiation of vertical filtering (data group) with content set to "All" and Filter set to "Down" are shown by reference numerals 909 and 913. In FIG. 9, the user selected an "Alerts" group 905 to further limit items on the circular interface display for Recipients; the Recipient sub-systems' and hosts' status reflect only the "Alerts" selection 905 from a tree filter pane 907. Similarly, the Originator and Producer sub-systems' status in a circular display pane 911 reflects only the "Alerts" selection 905 on the tree filter pane 907. The filter selection set to "Down" 909 causes objects for only the Alerts group to be displayed for all Recipient sub-systems; however, all hosts are displayed whether they participate in the Alerts data group or not. Recipients' host status reflects the remaining items on the display. The content selection set to "All" 913 causes both fault and non-fault conditions to be displayed on the circular display, subject to other selections described above.

Figure 10:
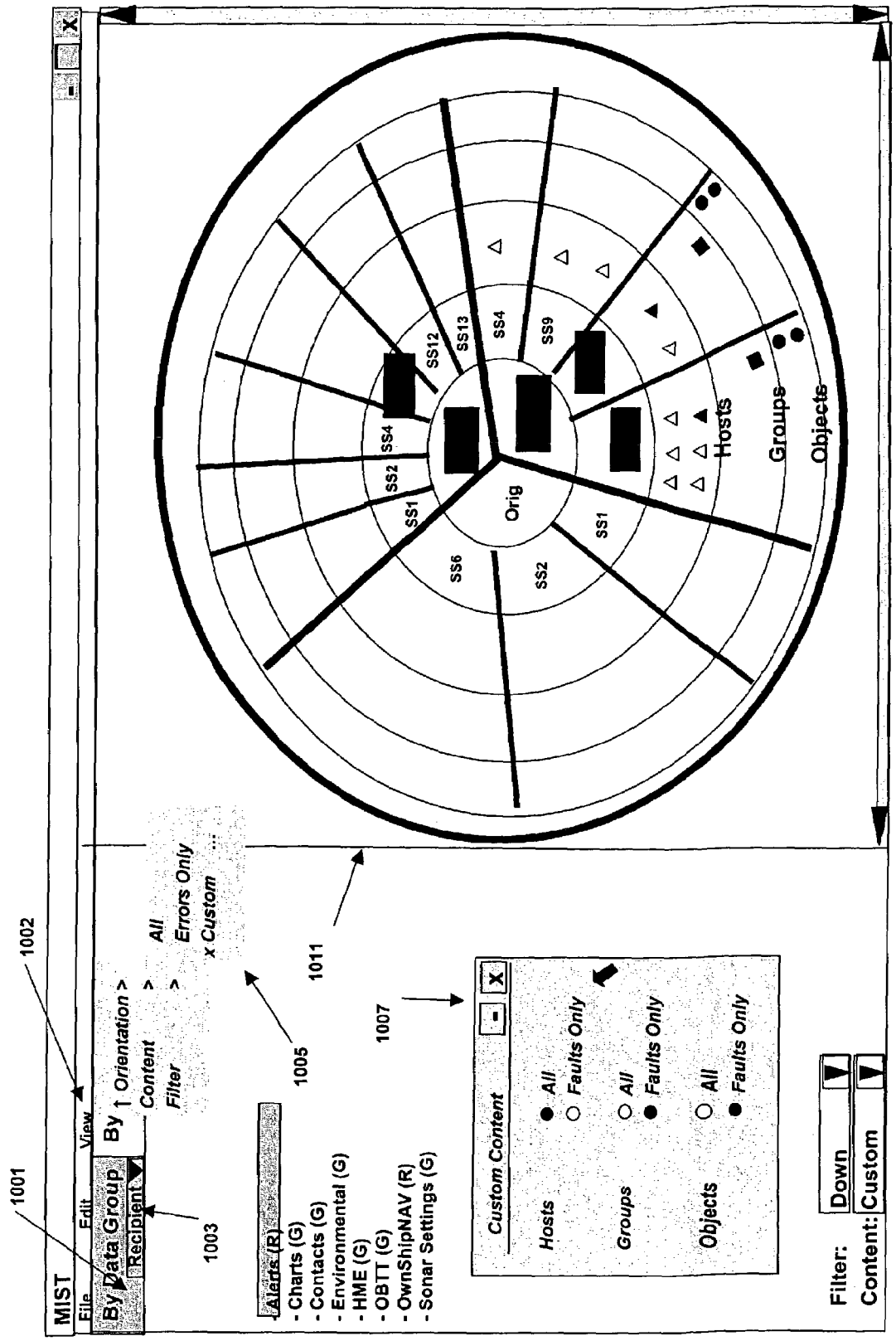
FIG. 10 illustrates an exemplary circular interface display with the "By Data Group" tab selected and "Recipient" selected in the pick-list; an embodiment of content control from the View menu set to "Custom" is described.
Figure 11:
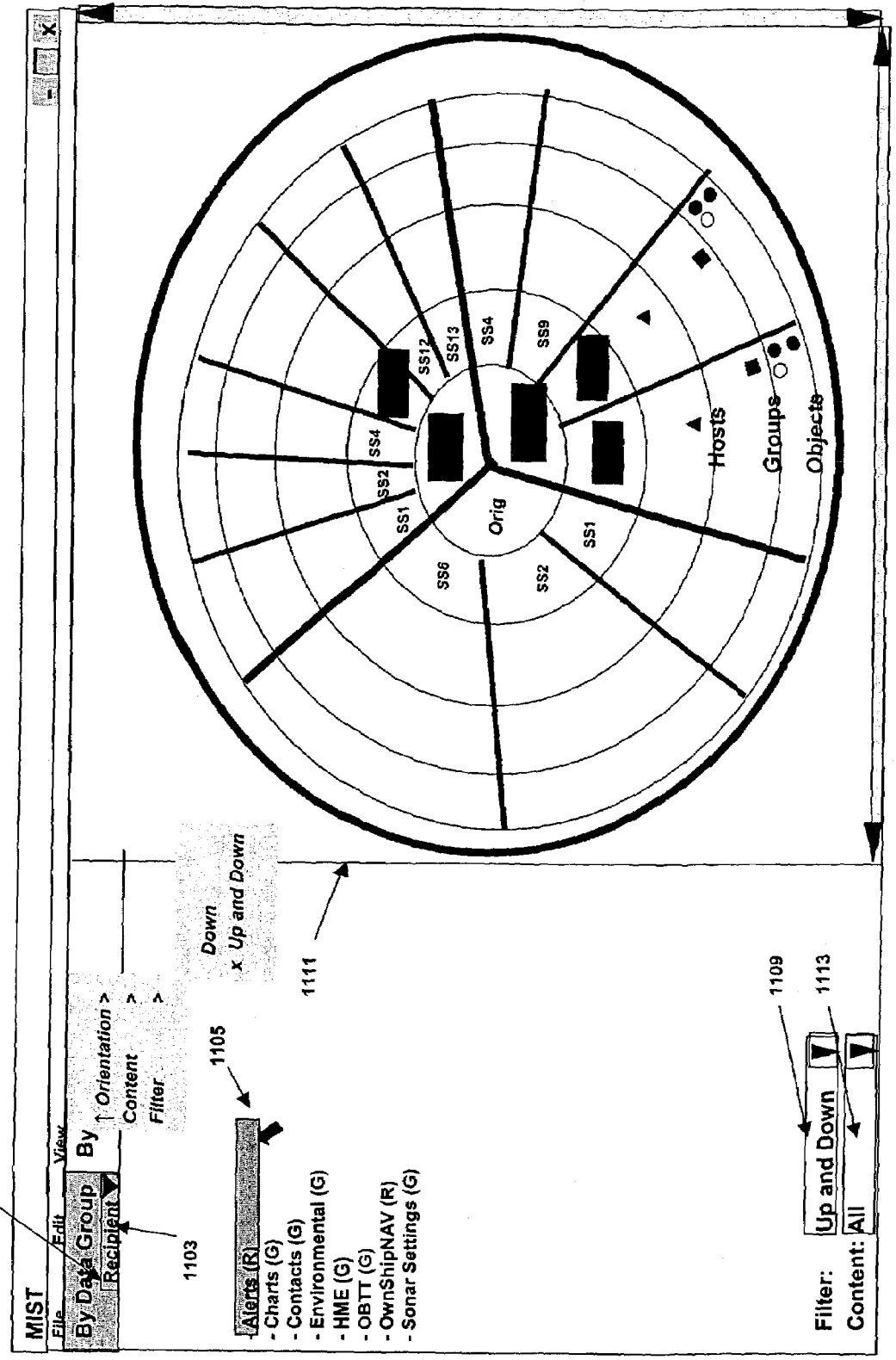
FIG. 11 illustrates an exemplary circular interface display with the "By Data Group" tab selected and "Recipient" selected in the pick-list. The results of user initiation of vertical filtering (data group) with Content set to "All" and Filter set to "Up and Down" are shown.

With reference now to FIG. 10 of the Drawings, there is illustrated an exemplary circular interface display with the "By Data Group" tab 1001 selected and "Recipient" selected in a pick-list 1003; an embodiment of content control from a view menu 1002 set to "Custom" 1005 is described. In FIG. 11, the user selected in a Custom Content box 1007 to view all hosts, only fault conditions for groups, and only fault conditions for objects. As a result, in contrast to FIG. 10, non-fault objects are not seen within the Recipient sub-systems of the circular display pane 1011.

With reference now to FIG. 11 of the Drawings, there is illustrated an exemplary circular interface display with the "By Data Group" tab 1101 selected and "Recipient" selected in a pick-list 1103. The results of user initiation of vertical filtering (Alerts data group 1105 highlighted), with content set to "All" 1113 and Filter set to "Up and Down" 1109, are shown. As a result of the selection indicated by reference numeral 1109 and in contrast to FIG. 10, hosts that do not have edges to the Alerts data group in the ISG are not displayed in the circular display pane 1111.

Figure 12:
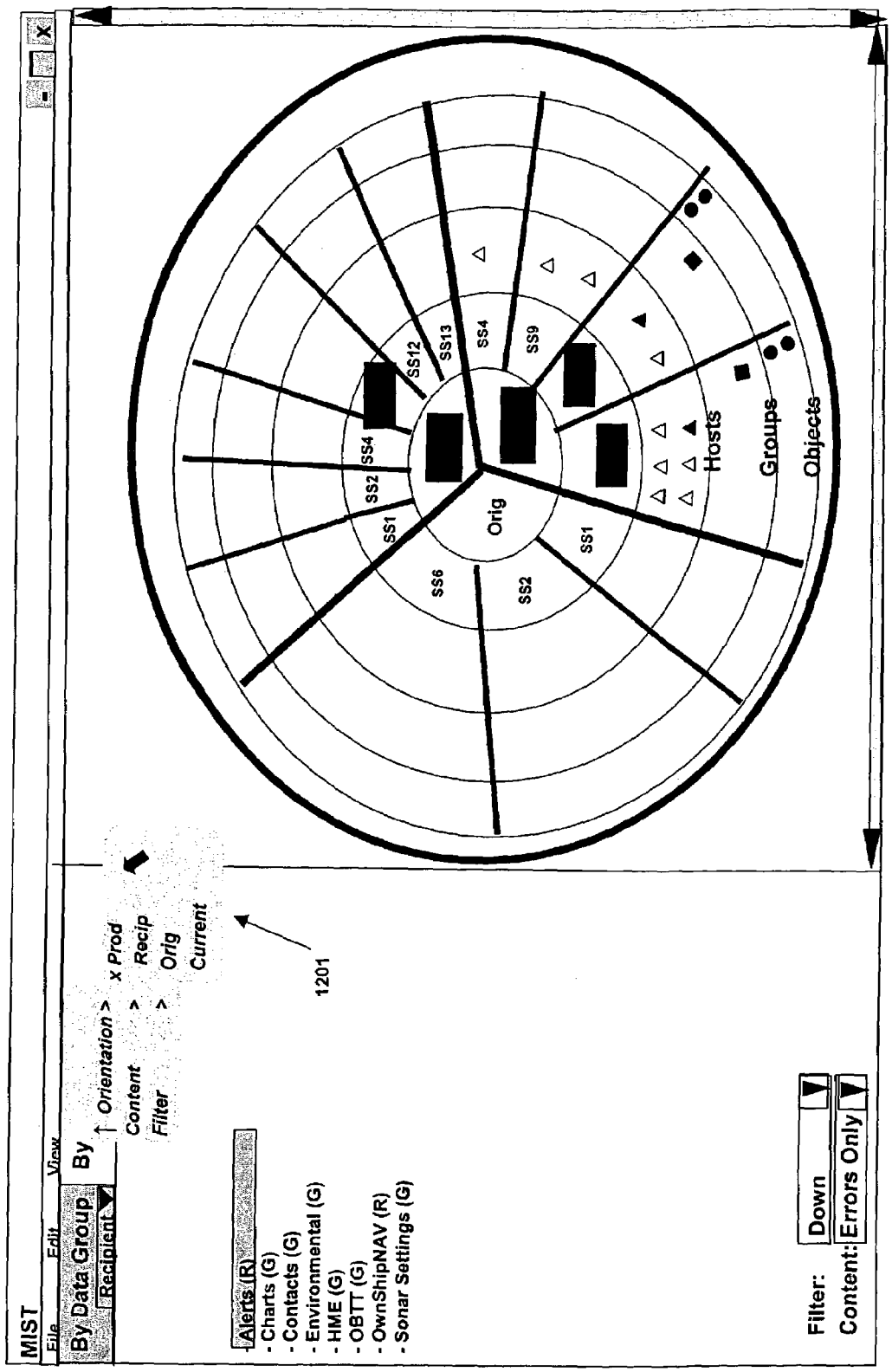
FIG. 12 illustrates an exemplary Orientation view control on a circular interface display.

With reference now to FIG. 12 of the Drawings, there is illustrated an exemplary orientation view control on a circular interface display. The user may select, via menu 1201, to orient the circular interface display such that the Originator, Producer, Recipient, or current pick-list selection is centered at the top of the screen.

Figure 13:
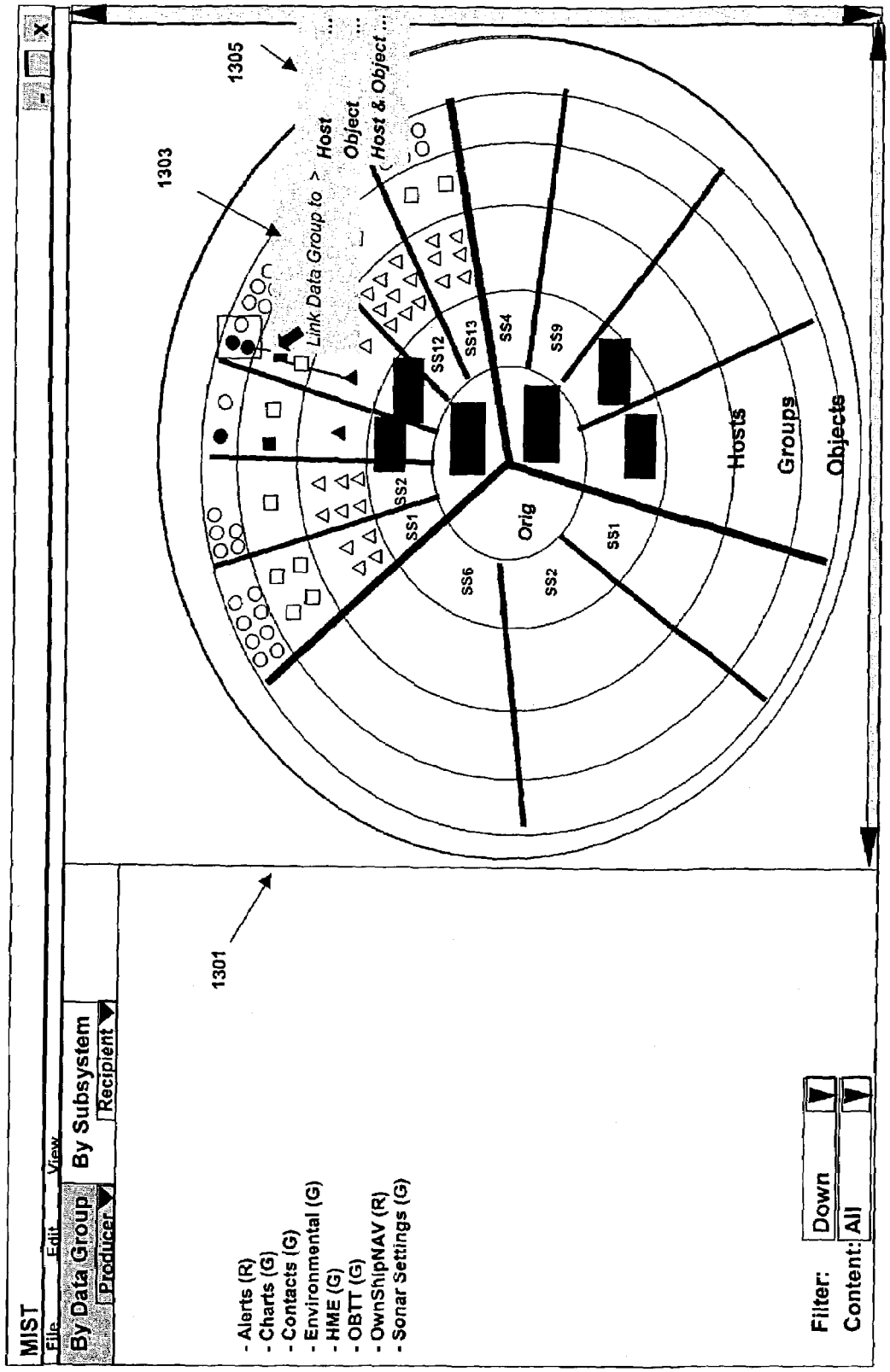
FIG. 13 illustrates an exemplary Link tool on the circular interface display.

With reference now to FIG. 13 of the Drawings, there is illustrated an exemplary link tool on the circular display pane 1301. The purpose of the link tool is to show the relationship between items in the circular interface display; the relationships correspond to edges that traverse levels of the ISG as shown in FIG. 6. The link tool adds selected edges from the ISG to the circular display pane 1301. These graph edges are not displayed by default due to the density of edges in the ISG. The user selects an object on the circular display pane 1301 and activates a pop-up menu 1303 that has content based on the type of element selected; in this example, a data group is selected. For the case of a data group, a sub-menu 1305 is displayed which allows the user to select a host, object, or object and host to link to the selected data group. Only hosts and objects that connect via ISG graph edges are available within the pop-up menu 1305.

Figure 14:
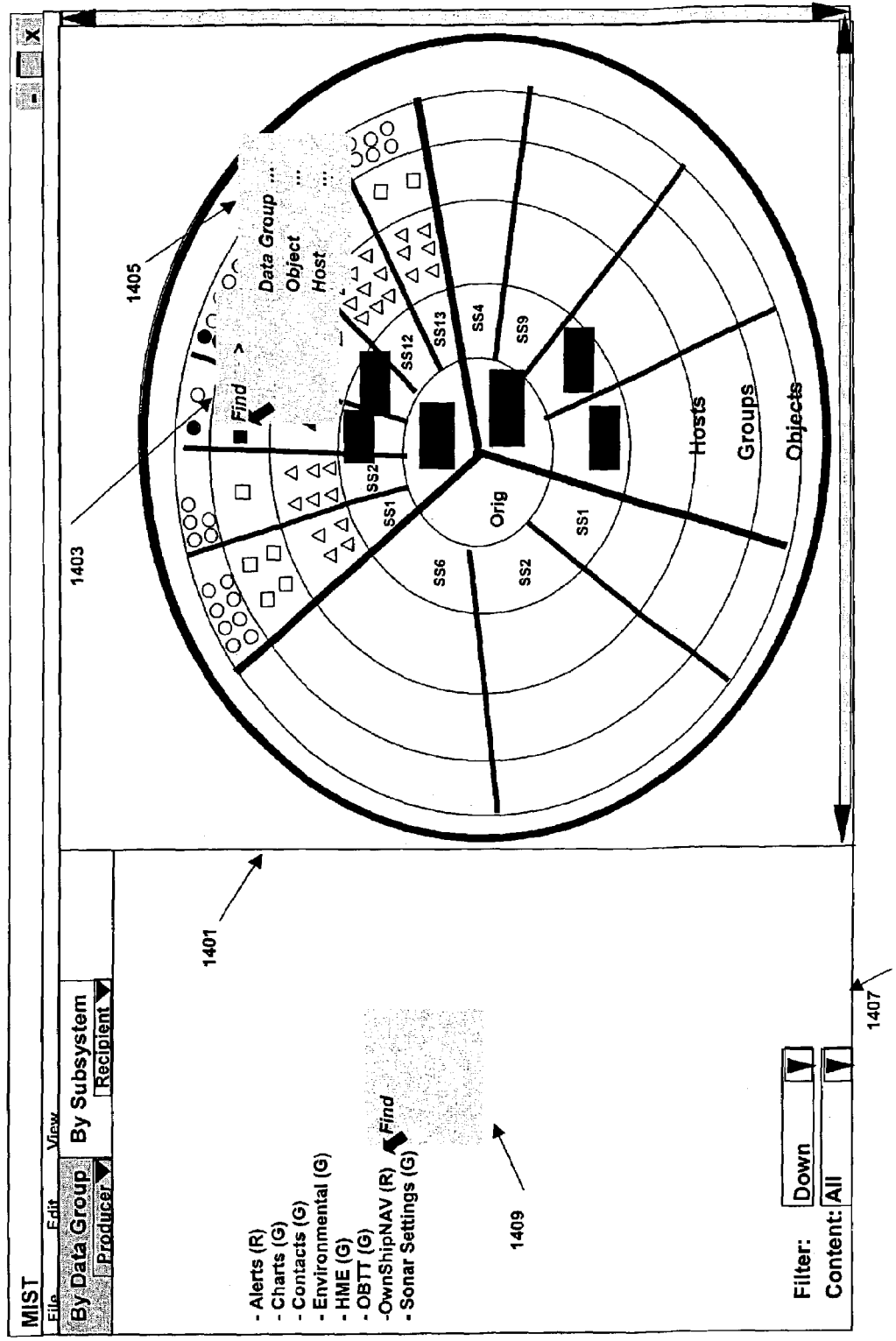
FIG. 14 illustrates an exemplary Find tool on the circular interface display.

With reference now to FIG. 14 of the Drawings, there is illustrated an exemplary find tool on the circular interface display. The purpose of the find tool is to locate items on the circular display pane. When initiated from the circular display pane 1401, a pop-up window 1403 is displayed. A sub-menu 1405 is then displayed to allow the user to find the desired data group, object, or host. After selection of an item to find, it is highlighted on the circular display pane 1401. A similar capability is provided on the tree filter pane 1407 to allow the user to track an item from the tree filter pane 1407 to the circular display pane 1401. From the tree filter pane 1407, the user selects an item and activates a find menu item 1409. After activation, the selected item is highlighted on the circular display pane 1401.

Figure 15:
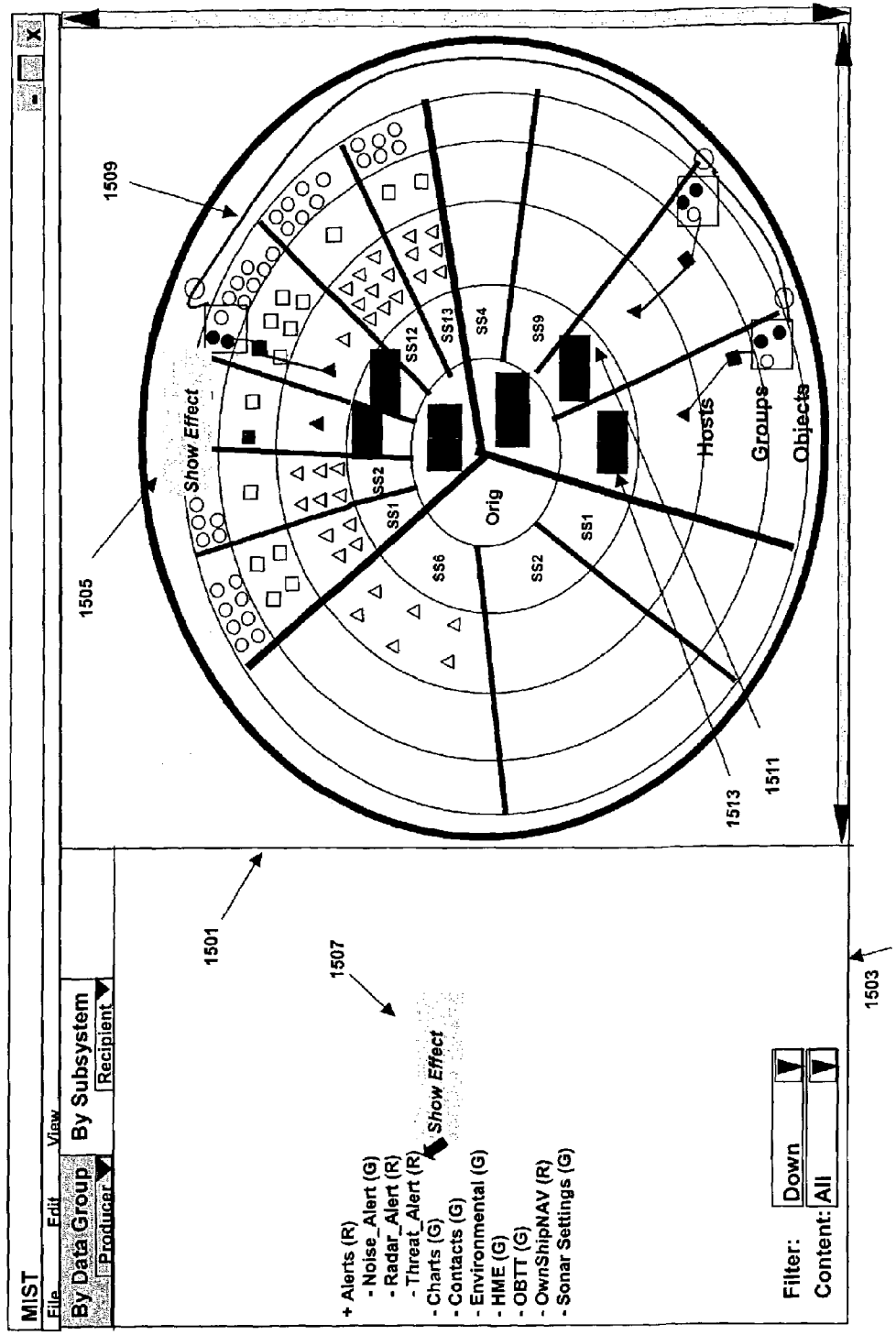
FIG. 15 illustrates an exemplary cause and effect tool on the circular interface display that is used to determine the effect of an error.
Figure 16:
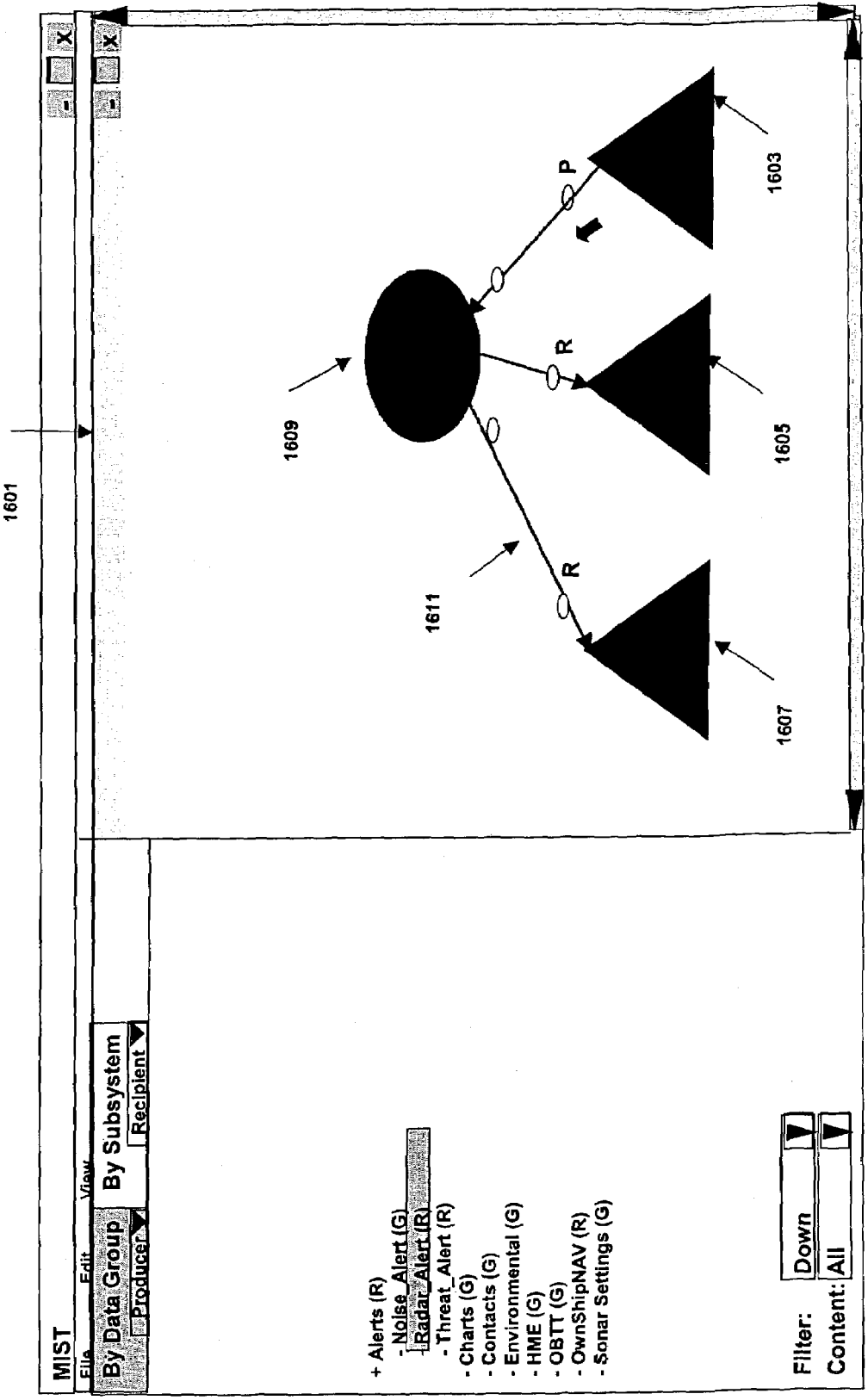
FIGS. 16 and 17 illustrate exemplary two-dimensional graph displays for the cause and effect display.

With reference now to FIG. 15 of the Drawings, there is illustrated an exemplary cause and effect tool on the circular interface display that is used to show the effect of an error. The cause and effect tool is a fundamental MIST capability that is used to depict the effects of a fault to the user. The user initiates the effect tool menu by selection of an item on the circular display pane 1501 (e.g., object) or tree filter pane 1503. The menu 1505 is shown on the circular display pane or on the tree filter pane at 1507. The effects of the fault are determined by traversing the ISG edges where <Originator, Provider> or <Provider, Recipient> pairs interconnect as described in FIG. 6. Methods interconnect objects on the display periphery 1509. Although not shown on these black and white figures, the methods are encoded with color to reflect their fault status. In FIG. 16, the effects of a fault in the Alerts group are shown to impact two Recipient sub-systems, Sub-system SS11 as shown by reference numeral 1511 and Sub-system SS13 as shown by reference numeral 1513.

Figure 17:
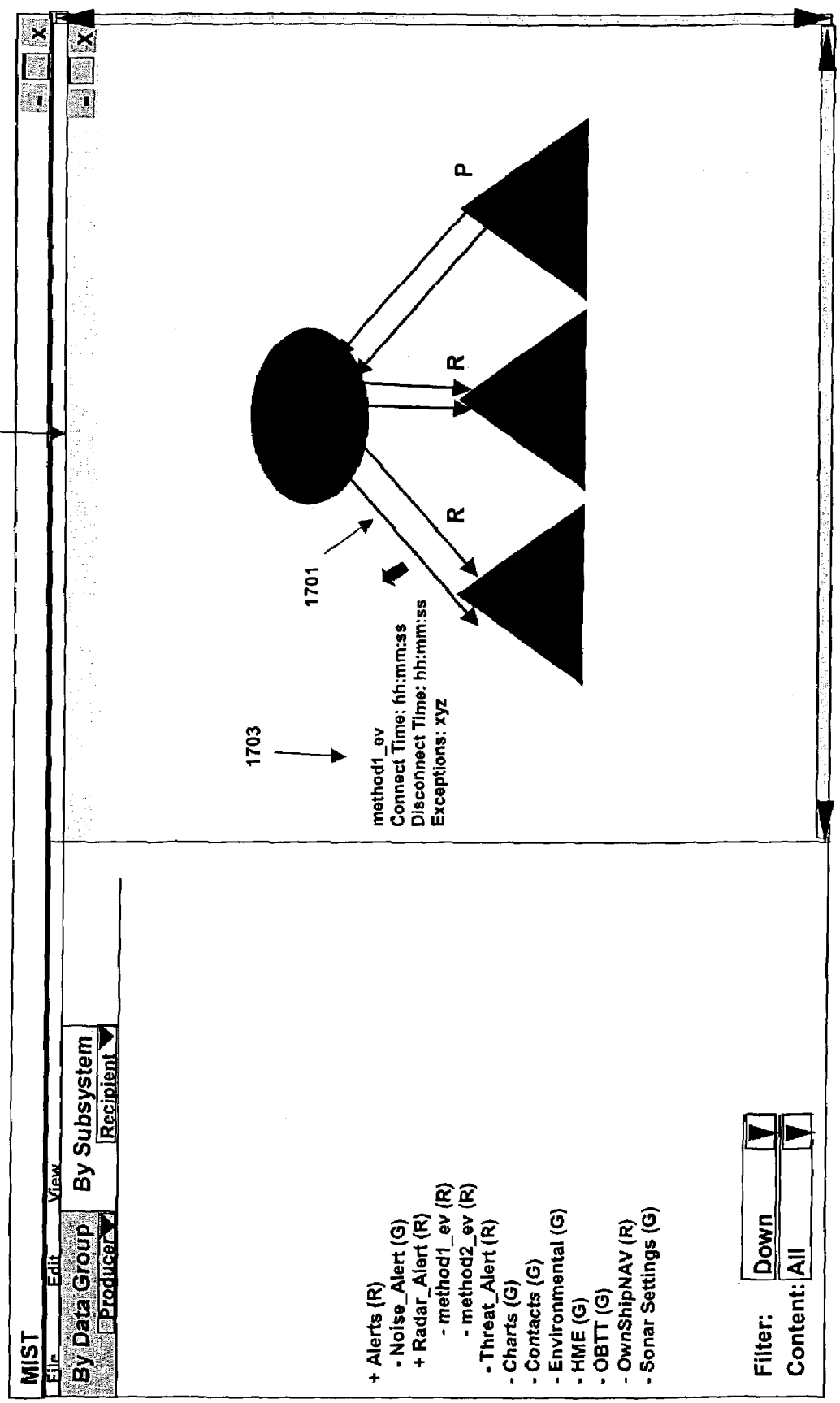
Figure 18:
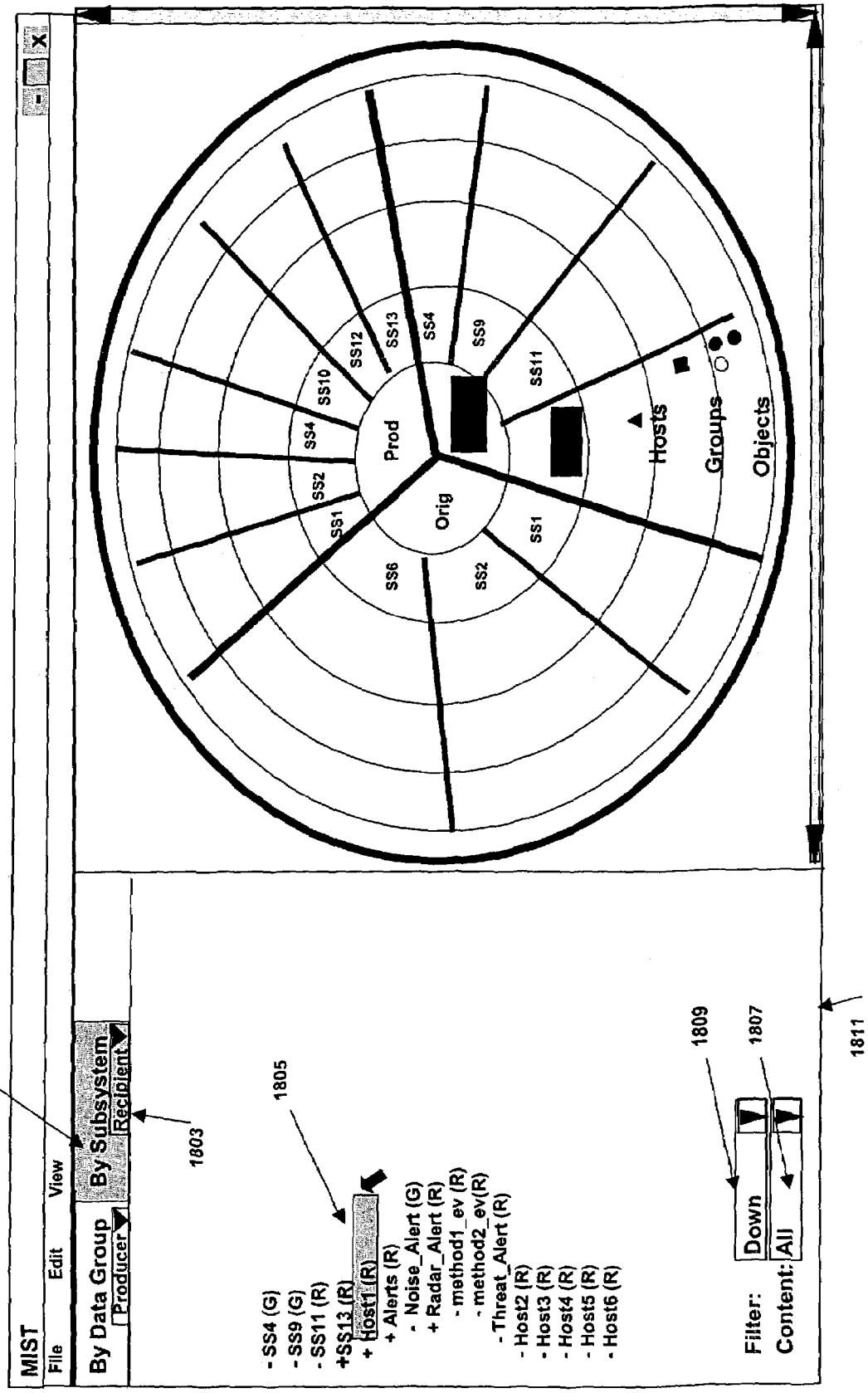
FIG. 18 illustrates an exemplary circular interface display with the "By Subsystem" tab selected and "Recipient" selected in the pick-list. The results of user initiation of vertical filtering (Host) with Content set to "All" and Filter set to "Down" are shown.

With reference now to FIG. 16 and FIG. 17 of the Drawings, there are illustrated exemplary two-dimensional graph screens for the cause and effect display. FIG. 16 and FIG. 17 depict an alternative approach to display the results of the cause and effect tool described in FIG. 15. Rather than display the results directly on the circular display pane, the results are displayed in a separate, non-modal window that contains a graph layout (1601 and 1701). Nodes from the ISG are displayed on the graph that are involved in the cause and effect analysis results. In the case of initiation from FIG. 15, a Provider host from sub-system SS10 at 1603, a Recipient host from sub-system SS11 at 1605, and a Recipient host from sub-system SS13 at 1607 are displayed. Edges between nodes correspond to methods provided by the Radar Alert object 1609 in the Alerts group. The Originator(s), Provider(s), and Recipient(s) are marked with O, P, and R respectively on FIGS. 16 and 17. Methods implemented by the object are initially bundled within a single line 1611; each method bundle may be expanded to show all methods' status 1701. In addition, the user can initiate a menu selection to display detailed data 1703 received via the IMI. In FIG. 17 and FIG. 18, the shapes of items on the display (e.g., triangular hosts) are consistent with those contained in the circular display pane. For illustrative purposes, color is indicated for the geometric items (e.g. hosts) of the display as unfilled for normal (green) and filled for critical (red). Although not shown on these black and white figures, the methods are encoded with color to reflect their fault status.

With reference now to FIG. 18 of the Drawings, there is illustrated an exemplary circular interface display with the "By Subsystem" tab selected 1801 and "Recipient" selected 1803 in the pick-list. The results of user initiation of vertical filtering (Host 1) 1805 with Content set to "All" 1807 and Filter set to "Down" 1809 are shown. The "By Subsystem" selection 1801 provides a sub-system viewpoint on the tree filter pane 1811. The ISG is depicted in the tree filter pane beginning at the sub-system level 606.

Figure 19:
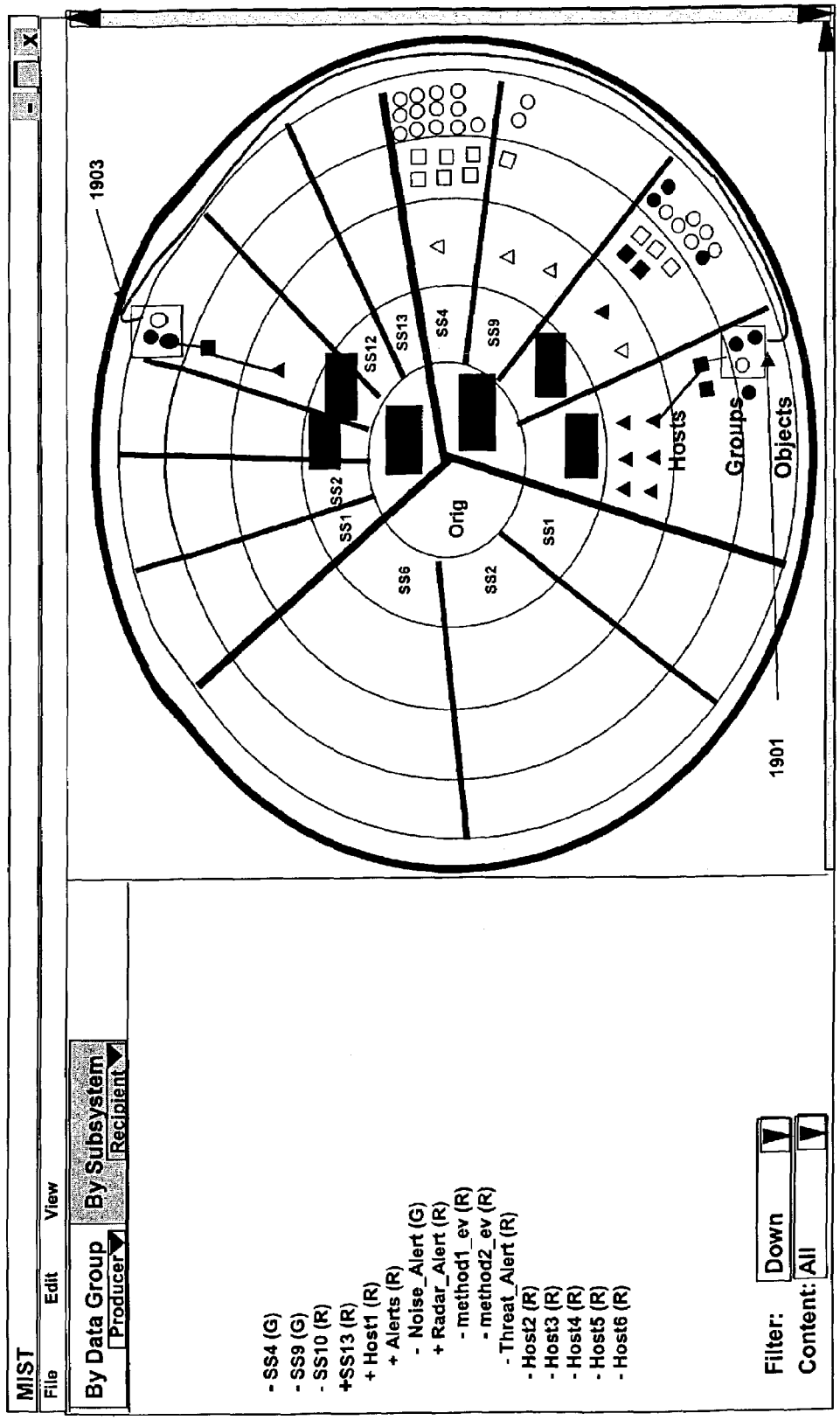
FIG. 19 illustrates an exemplary cause and effect tool on the circular interface display to determine the cause of an error.
Figure 20:
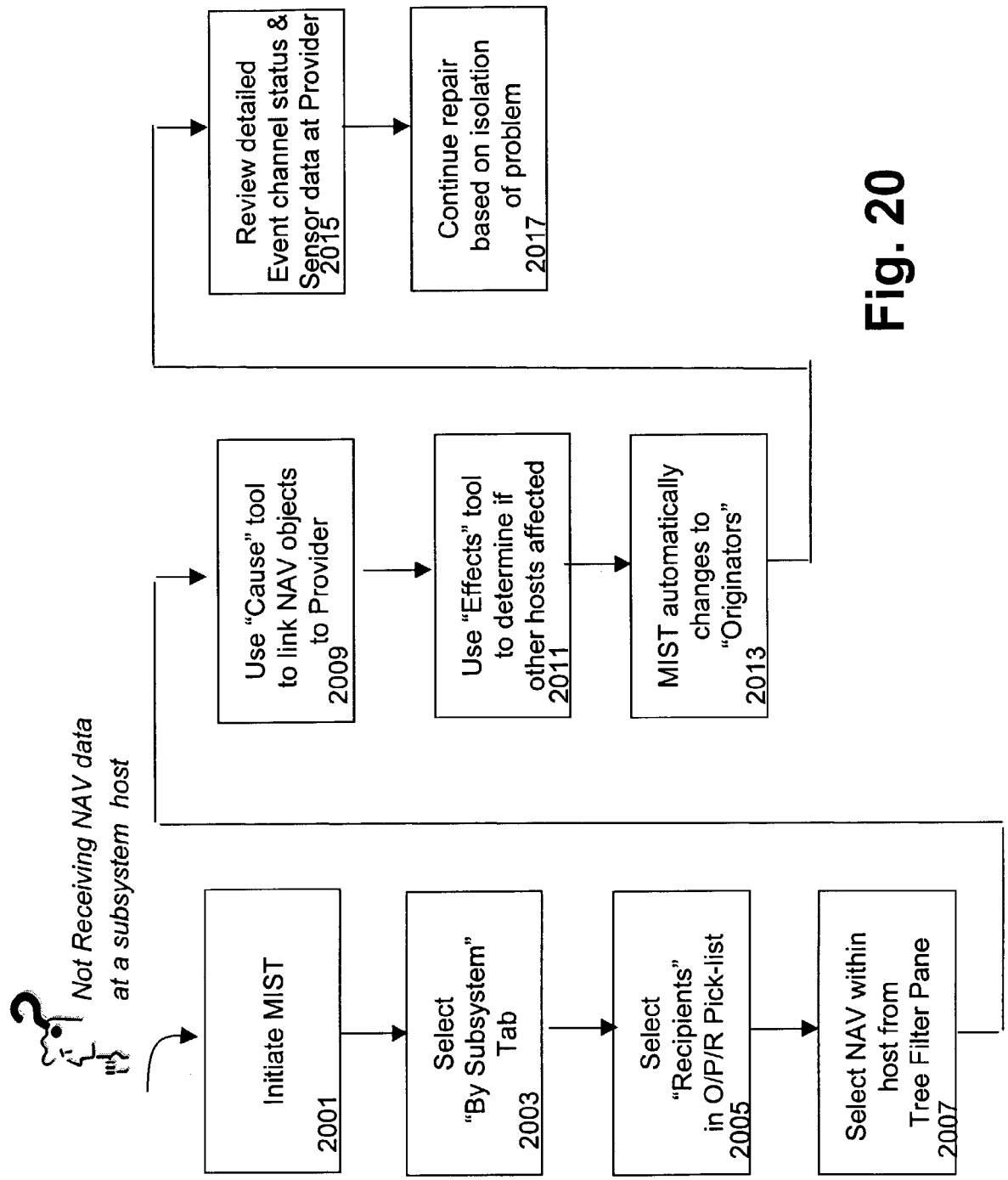
FIGS. 20 and 21 are flow diagrams that provide exemplary descriptions of an operator using the MIST while attempting to pinpoint the cause of an interface fault.

With reference now to FIG. 19 of the Drawings, there is illustrated an exemplary cause and effect tool on the circular interface display to determine the cause of an error. The cause and effect tool is a fundamental MIST capability that is used to depict the cause of a fault to the user. The user initiates the tool by selection of an item on the circular interface display (e.g., object) or tree filter pane. The cause of the fault are determined by traversing the ISG edges where <Originator, Provider> or <Provider, Recipient> pairs interconnect as described in FIG. 6. Methods interconnect objects on the display periphery. In FIG. 20, the cause of a fault in the Alerts group is shown to result from the sub-system SS10 Originator 1903.

Figure 21:
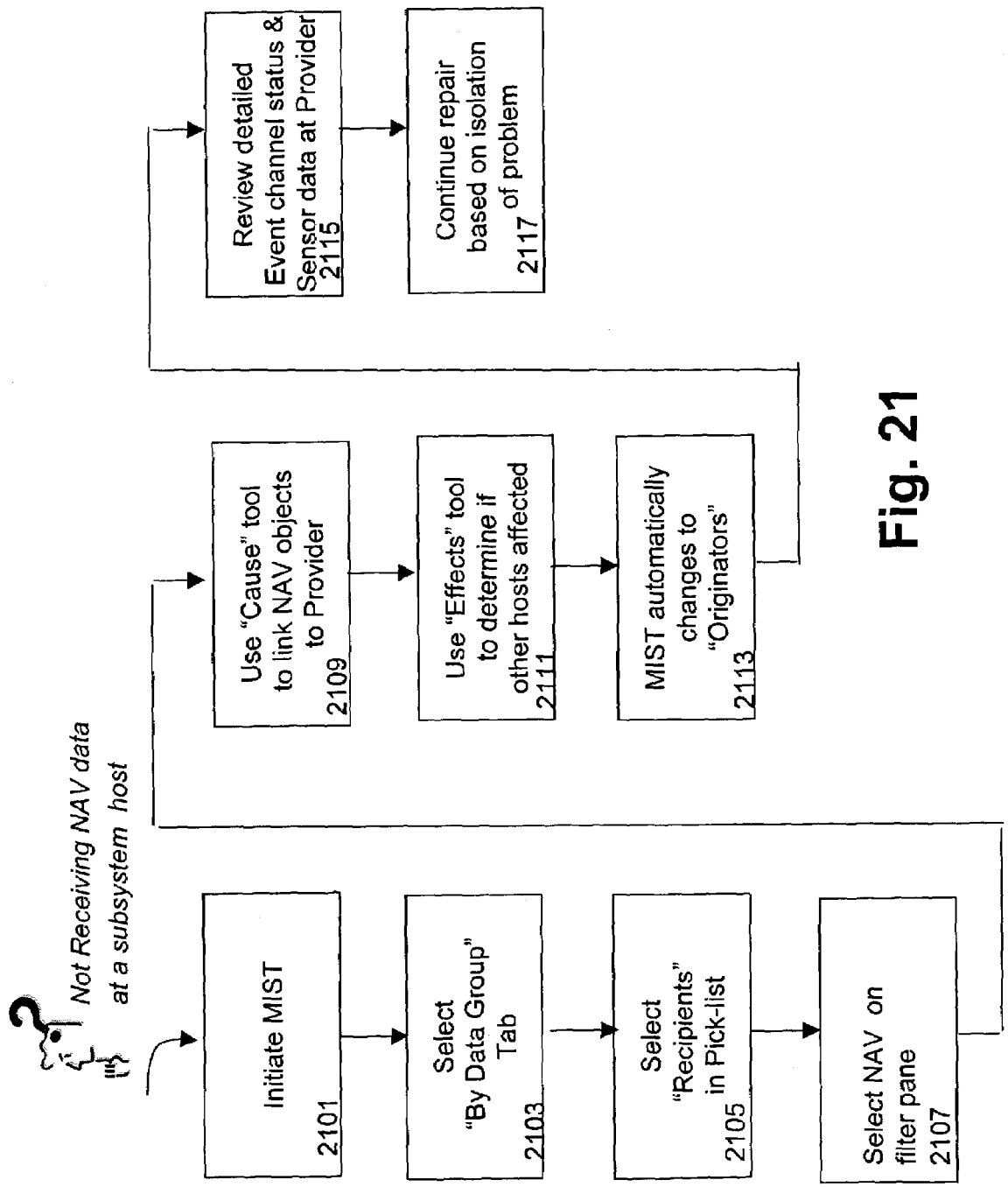

With reference now to FIG. 20 and FIG. 21 of the Drawings, there are illustrated flow diagrams that provide exemplary descriptions of an operator using the MIST to pinpoint the cause of an interface fault. The user initiates the MIST after detection that Navigation data is not being received. The steps shown in FIG. 20 are described below.

The flow diagram illustrated in FIG. 20 is based on a user with a sub-system viewpoint. The MIST is initiated in step 2001. The user selects the "By Subsystem" tab on the display in step 2003. The user selects "Recipients" from the pick list in step 2005. The user selects the NAV data group within the host from the tree filter pane in step 2007. The user selects the "Cause" tool to link faults to the Provider in step 2009. The user selects the "Effects" tool to determine if other sub-systems are affected in step 2011. The MIST automatically transitions to "Originators" in the pick-list in step 2013. The user reviews detailed event channel status and Sensor data status at the Provider in step 2015. Finally, as necessary, the user continues to debug the fault in step 2017 by, for example, initiating the SUM.

The flow diagram illustrated in FIG. 21 is based on a user with a data group viewpoint. The user initiates the MIST after detection that Navigation data is not being received. The MIST is initiated in step 2101. The user selects the "By Data Group" tab on the display screen in step 2103. The user selects "Recipients" from the pick list in step 2105. The user selects the NAV data group from the tree filter pane in step 2107. The user selects the "Cause" tool to link faults to the Provider in step 2109. The user selects the "Affects" tool to determine if other sub-systems are affected in step 2111. The MIST automatically transitions to "Originators" in the pick-list in step 2113. The user reviews detailed event channel status and Sensor data status at the provider in step 2115. Finally, as necessary, the user continues to debug the fault in step 2117 by, for example, initiating the SUM.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. An apparatus for identifying, monitoring and displaying the status of interfaces in a system, comprising:
a middle-ware interface status tool (MIST) that communicates with a system to determine interfaces in the system, monitor the interfaces, and generate an interface status graph (ISG) depicting a status of the interfaces, wherein the system includes at least one sub-system that includes at least one host and a plurality of data objects that are originated, produced and received within the system;
means for retrieving information that characterizes the system;
means for determining information from a name server (NS), wherein the NS includes a hierarchical directory of the plurality of data objects within the system and object references (ORs) for the data objects;
means for receiving event channel status information from one or more event channels, each event channel being operatively connected to the MIST, wherein the event channel status information includes connection status, connection updates, and exception information; and
means for receiving server object status from one or more middle-ware servers, each middle-ware server operatively connected to the MIST,
wherein the ISG has a structure that depicts the interfaces in the system and the middle-ware interface status tool indicates the mode of operation in which the ISG structure is populated with the information that characterizes the system, determined from the hierarchical directory of the NS, and the ORs from the NS.

2. The apparatus recited in claim 1, further comprising an interface database (IDB), the IDB containing information that characterizes the system, wherein the middle-ware interface status tool includes a static mode of operation.

3. The apparatus recited in claim 1, further comprising an interface database (IDB), the IDB containing information that characterizes the system, wherein the event channel status information includes recipient sub-system and host information, the middle-ware interface status tool includes a partially dynamic mode of operation, and the recipient sub-system and host information from the one or more event channels.

4. The apparatus recited in claim 1, wherein the event channel status information includes recipient sub-system and host information and methods, the middle-ware interface status tool includes a dynamic mode of operation, and the recipient sub-system and host information and methods from the at least one event channel.

5. The apparatus recited in claim 4, wherein the MIST determines the information from the hierarchical directory by walking the hierarchical directory.

6. The apparatus recited in claim 1, further comprising:
means for retrieving operational information from an operation database (ODB), wherein the ODB comprises a mapping of detected interface faults to operational impacts.

7. The apparatus recited in claim 1, further comprising:
means for retrieving system information from a system user manual (SUM), wherein the means for retrieving system information comprises a mapping of detected errors to at least one page in the SUM.

8. The apparatus recited in claim 1, wherein the information that characterizes the system includes information corresponding to: (i) data groups, (ii) middle-ware objects, (iii) object methods, (iv) Providers, (v) Recipients, and (vi) Originators.

9. The apparatus recited in claim 1, further comprising instrumented management interfaces (IMIs) connecting the middle-ware interface status tool with each event channel.

10. The apparatus recited in claim 1, wherein the middle-ware interface status tool periodically queries the at least one middle-ware server to verify object processes running and wherein the middle-ware interface status tool uses periodic middle-ware calls to server methods to determine server object status.

11. The apparatus recited in claim 1, wherein the middle-ware interface status tool includes a graphical user interface (GUI) that displays the ISG.

12. The apparatus recited in claim 11, wherein the GUI is a circular display.

13. The apparatus recited in claim 12, wherein the circular display includes succeeding rings that depict succeeding levels of the ISG.

14. The apparatus recited in claim 13, wherein an innermost ring depicts Originators, Producers, and Recipients and a next succeeding ring depicts sub-systems.

15. The apparatus recited in claim 12, wherein the circular display includes a circular display pane and a tree filter pane.

16. The apparatus recited in claim 15, wherein the tree filter pane includes a tree filter that can be expanded or collapsed to permit user selection of the amount of information depicted in the circular display pane.

17. The apparatus recited in claim 11, wherein content of the GUI is altered by user selection.

18. The apparatus recited in claim 11, wherein the GUI provides a horizontal slicing mechanism and a vertical slicing mechanism for limiting the display of information in the ISG.

19. The apparatus recited in claim 18, wherein the horizontal slicing mechanism limits the display in the ISG to status of sub-systems or status of data groups, wherein data groups are related groupings of data objects.

20. The apparatus recited in claim 19, wherein the vertical slicing mechanism limits the display in the ISG to a status of a selected sub-system or a selected data group.

21. The apparatus recited in claim 11, wherein the GUI includes one or more display tools chosen from a list consisting of: a link elements tool, a cause-effect analysis tool, a data source status tool, an operation impact tool, and, a user manual link tool.

22. An apparatus for identifying, monitoring and displaying the status of interfaces in a system, comprising:
a middle-ware interface status tool (MIST) implemented in a data processing system that communicates with a system to determine interfaces in the system, monitor the interfaces, and generate an interface status graph (ISG) depicting a status of the interfaces, wherein the system includes at least one sub-system that includes at least one host and a plurality of data objects that are originated, produced and received within the system;
an interface database (IDB), operatively connected to the MIST, the IDB comprising information that characterizes the system;
a name server (NS), operatively connected to the MIST, wherein the NS includes a hierarchical directory of the plurality of data objects within the system and IIOP object references (ORs) for the data objects;
one or more event channels, operatively connected to the MIST, wherein each event channel provides event channel status information including connection status, connection updates, and exception information to the MIST; and one or more middle-ware servers, operatively connected to the MIST, wherein each middle-ware server provides server object status to the MIST.

23. A method for monitoring status of a system, comprising steps of:
retrieving information that characterizes a system, the system including at least one sub-system that includes at least one host and a plurality of data objects that are originated, produced and received within the system;
populating data structures of a connectivity interface status graph (ISG) with the retrieved information;
scanning objects and mapping the scanned objects to hosts and subsystems;
updating the data structures of the ISG based on the mapping step;
subscribing to an instrumented management interface (IMI) for each of a plurality of event channels;
pinging Originators and Producers for status information;
monitoring IMI event channels to determine event channel status information;
monitoring servers to determine server object status information; and
updating the ISG with the status information from the pinging and monitoring steps.

24. The method as recited in claim 23, further comprising a step of:
determining data groups and objects in the system by walking a name server, the name server mapping middle-ware objects to hostname objects, wherein the updating step updates the data structures of the ISG dynamically based on the determined structure.

25. The method as recited in claim 23, further comprising a step of partially populating an information database (IDB) with the information that characterizes the system prior to the retrieving step.

26. The method as recited in claim 23, further comprising a step of displaying the ISG on a circular display.

27. The method as recited in claim 26, wherein the displaying step displays the ISG using colors to indicate a varying severity of alerts in the system.

28. The method as recited in claim 23, wherein the ISG fully describes data connectivity of the system.

29. The method as recited in claim 23, wherein the system includes methods, the method further including determining faults in methods in the system.

30. The method as recited in claim 29, wherein ISG depicts methods connected to data objects, the method further including determining faults in data objects if methods connected to the data objects aggregate one or more faults.

31. The method as recited in claim 30, wherein the data objects include originator, producer and recipient data objects, the method further including determining faults in recipient data objects if faults exists in methods connected to corresponding originator or producer data objects.

32. The method as recited in claim 30, wherein the ISG depicts data groups that include one or more functionally related data objects connected to the data group, the method further including determining faults in data groups if data objects connected to the data groups aggregate one or more faults.

33. The method as recited in claim 32, wherein the ISG depicts at least one host including connected data groups, the method further including determining a fault in the at least one host if data groups connected to the host aggregate one or more faults.

34. The method as recited in claim 23, wherein the ISG depicts at least one sub-system including connected hosts, the method further including determining a fault in the at least one sub-system if the hosts connected to the at least one sub-system aggregates one or more faults.

35. The method as recited in claim 23, wherein the monitoring servers step comprises performing server calls.

36. A method for monitoring status of a system, comprising:
determining data groups and objects in the system by walking a name server, the name server mapping middle-ware objects to hostname objects;
populating data structures of a connectivity interface status graph (ISG) with the determined structure;
scanning objects and mapping objects to hosts and subsystems;
updating the data structures in the ISG based on the mapping step;
subscribing to an instrumented management interface (IMI) for each of a plurality of event channels;
pinging Originators and Producers for status information;
monitoring IMI event channels to determine event channel status information;
monitoring servers to determine server object status information; and
updating the ISG with the status information from the pinging and monitoring steps.

37. An apparatus for identifying, monitoring and displaying the status of interfaces in a system, comprising:
at least one event channel including an instrumented management interface (IMI) for providing status information regarding end-to-end receipt of data in a system:
a middle-ware interface status tool (MIST) implemented in a data processing system that communicates with a system via said IMI to determine interfaces in the system, monitoring the interfaces, and generate an interface status graph (ISG) depicting a status of the interfaces, wherein the system includes at least one sub-system that includes at least one host and a plurality of data objects that are originated, produced and received within the system.

38. The apparatus as recited in claim 37, further comprising:
an interface database (IDB), operatively connected to the MIST, the IDB comprising information that characterizes the system.

39. The apparatus as recited in claim 37, further comprising:
a name server (NS), operatively connected to the MIST, wherein the NS includes a hierarchical directory of the plurality of data objects within the system and IIOP object references (ORs) for the data objects.

40. The apparatus as recited in claim 37, further comprising:
one or more event channels, operatively connected to the MIST, wherein each event channel provides event channel status information including connection status, connection updates, and exception information to the MIST.

41. The apparatus as recited in claim 37, further comprising:
one or more middle-ware servers, operatively connected to the MIST, wherein each middle-ware server provides server object status to the MIST.

* * * * *